(12) United States Patent
Takagi et al.

(10) Patent No.: US 6,252,332 B1
(45) Date of Patent: Jun. 26, 2001

(54) ULTRASONIC MOTOR

(75) Inventors: Tadao Takagi, Yokohama; Takatoshi Ashizawa, Kawasaki, both of (JP)

(73) Assignee: Nikon Corporation, Tokyo (JP)

( * ) Notice: Subject to any disclaimer, the term of this patent is extended or adjusted under 35 U.S.C. 154(b) by 930 days.

(21) Appl. No.: 08/826,039

(22) Filed: Mar. 28, 1997

Related U.S. Application Data

(63) Continuation of application No. 08/391,565, filed on Feb. 21, 1995, now abandoned.

(30) Foreign Application Priority Data

Feb. 28, 1994 (JP) ................................................ 6-029466
Nov. 9, 1994 (JP) ................................................ 6-275022

(51) Int. Cl.⁷ ................................................ H02N 2/00
(52) U.S. Cl. .................... 310/323.02; 310/328; 310/317
(58) Field of Search ............... 310/317, 323.01–323.21, 310/328

(56) References Cited

U.S. PATENT DOCUMENTS

| 4,122,797 | * | 10/1978 | Kawamura et al. | 116/137 A |
| 4,743,788 | | 5/1988 | Takagi et al. | 310/316 |
| 4,812,697 | * | 3/1989 | Mishiro | 310/323 |
| 4,893,045 | * | 1/1990 | Honda | 310/323 |
| 4,965,482 | * | 10/1990 | Ohnishi et al. | 310/323 |
| 5,101,132 | * | 3/1992 | Yamaguchi | 310/323 |
| 5,191,688 | * | 3/1993 | Takizawa et al. | 310/323 |
| 5,416,375 | * | 5/1995 | Funakubo et al. | 310/323 |

FOREIGN PATENT DOCUMENTS

| 6106028 | * | 11/1988 | (JP) | 310/328 |
| 0491668 | * | 3/1992 | (JP) | 310/323 |
| 5344758 | * | 12/1993 | (JP) | 310/328 |
| 6006989 | * | 1/1994 | (JP) | 310/328 |

OTHER PUBLICATIONS

Piezoelectric Linear Motors for Application to Driving a Light Pick–Up Element, Y. Tomikawa, M. Aoyagi, T. Ogasawara, A. Yabukl, Tohoku Institute of Technology, Sendai, Jun. 9–11, 1993, all pages.

Ultrasonic Motors Theory and Applications, S. Ueha, Y. Tomikawa, M. Kurosawa, N, Nakamura, Tokyo Institute of Technology, 1993, all pages.

* cited by examiner

Primary Examiner—Thomas M. Dougherty

(57) ABSTRACT

An ultrasonic motor includes a vibrator vibrating in conformity with a frequency voltage. A relative motion member effects relative vibration in conformity with the vibration of the vibrator. The vibrator is adapted to vibrate in a first vibration mode and a second vibration mode vibrating in a direction differing from the first vibration mode. The resonance frequency of the first vibration mode is higher than the resonance frequency of the second vibration mode.

7 Claims, 15 Drawing Sheets

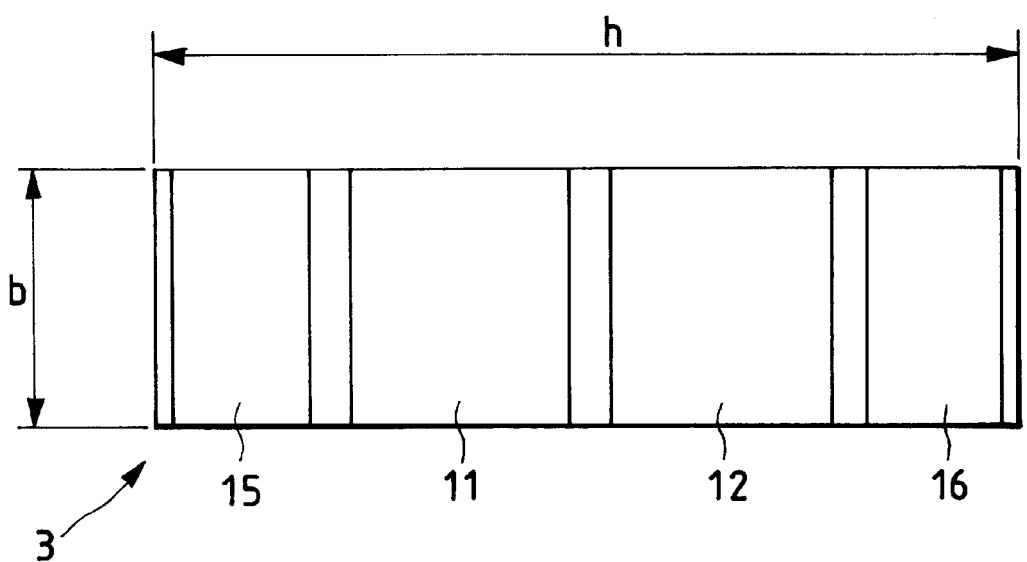
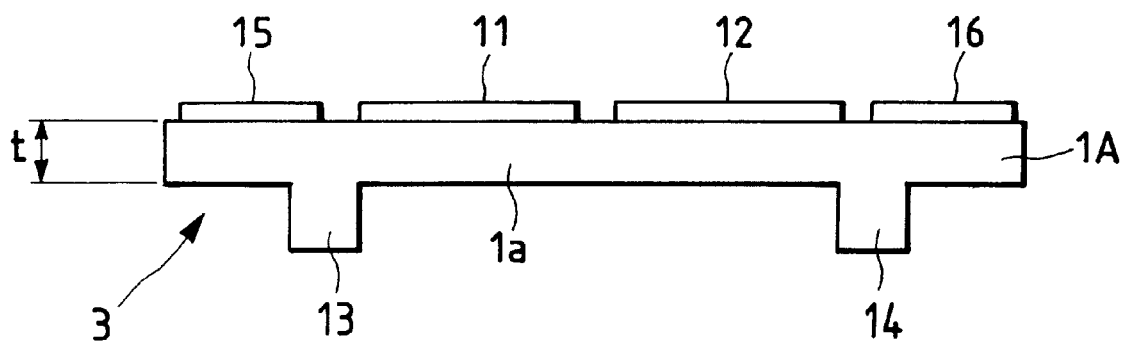

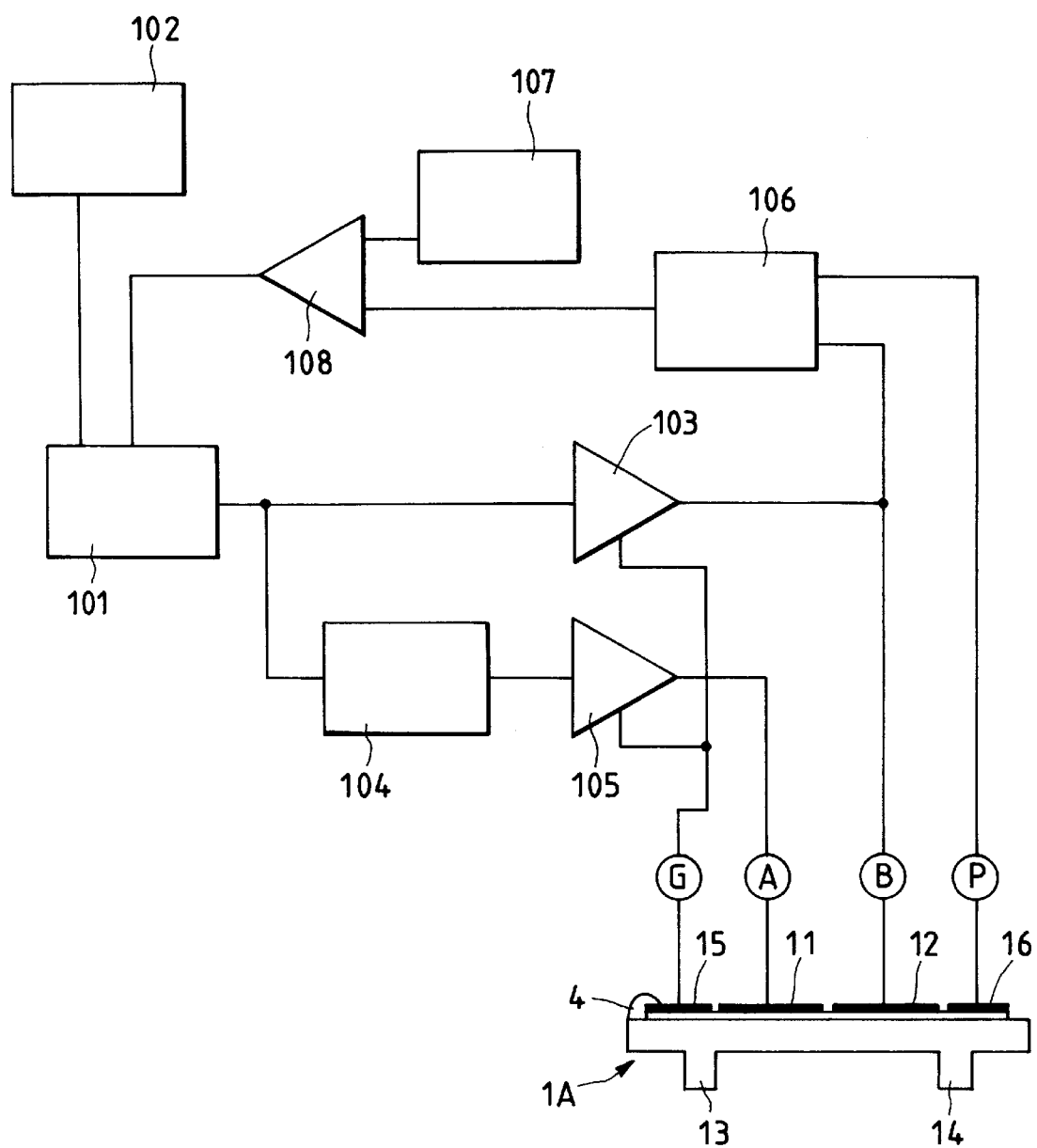

FIG. 13A  t=0 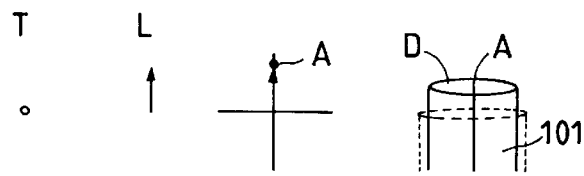
FIG. 13B  t=(1/4)π 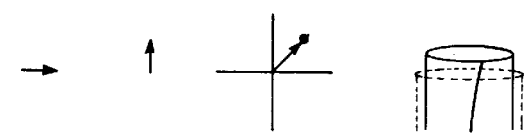
FIG. 13C  t=(2/4)π 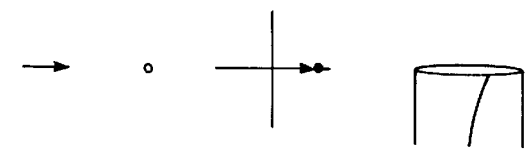
FIG. 13D  t=(3/4)π 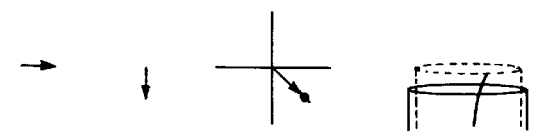
FIG. 13E  t=(4/4)π 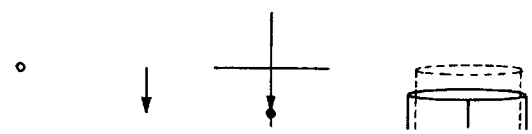
FIG. 13F  t=(5/4)π 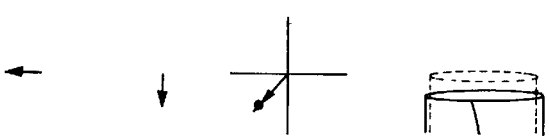
FIG. 13G  t=(6/4)π 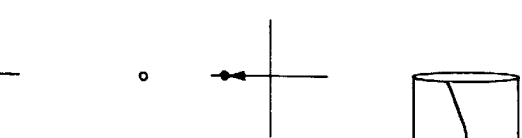
FIG. 13H  t=(7/4)π 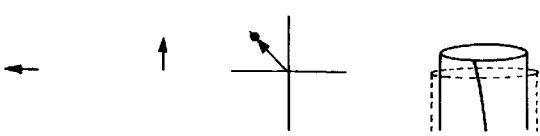

ULTRASONIC MOTOR

This application is a continuation, of application Ser. No. 08/391,565, filed Feb. 21, 1995, now abandoned.

BACKGROUND OF THE INVENTION

1. Field of the Invention

This invention relates to an ultrasonic motor utilizing ultrasonic vibration and an ultrasonic actuator.

As an ultrasonic motor of this kind, there is known a "heteromorphic degeneration longitude L1–bend B4 mode planar motor" described, for example, in "the Lecture Papers in the 5th Dynamics Symposium Related to Electromagnetic Force".

FIGS. 4A to 4C of the accompanying drawings show the structure of the ultrasonic motor described in the above-mentioned publication. FIG. 4A is a view of the ultrasonic motor as it is seen from just above it, FIG. 4B is a cross-sectional view of the ultrasonic motor taken in the direction of arrow P, and FIG. 4C is a cross-sectional view of the ultrasonic motor taken in the direction of arrow Q.

In FIGS. 4A to 4C, the reference numeral 1 designates a resilient member having piezoelectric elements 11 and 12 adhesively secured to the upper surface thereof, and electrodes, not shown, are adhesively secured to the upper surfaces of the piezoelectric elements 11 and 12. Also, projected portions 13 and 14 are formed on the lower surface of the resilient member 1, and vibration created in the resilient member 1 is taken out by these projected portions 13 and 14. These projected portions 13 and 14 will hereinafter be called the drive force taking-out portions. The piezoelectric elements 11 and 12 are polarized in the same direction, and high frequency voltages differing in phase by 90 degrees ($\pi/2$) from each other are applied to the respective piezoelectric elements 11 and 12 through the electrodes.

2. Related Background Art

FIG. 7 of the accompanying drawings shows the relation between the frequency of the high frequency voltages applied to the piezoelectric elements 11 and 12 of the ultrasonic motor of FIGS. 4A to 4C and the amplitude of the vibration created in the resilient member 1.

As shown in FIG. 7, as the frequency of the high frequency voltages is gradually dropped from a maximum frequency $f_{max}$, the amplitude of the vibration becomes gradually greater. When the frequency of the high frequency voltages becomes lower than a frequency $f_b$ for which the amplitude of the vibration becomes maximum, the amplitude of the vibration suddenly decreases and the ultrasonic motor becomes stopped. The frequency for which the shown amplitude of the vibration becomes greatest is generally called the resonance frequency, and when the ultrasonic motor is driven at this frequency, the ultrasonic motor can be driven most efficiently.

On the other hand, as the frequency of the high frequency voltages is gradually increased from a minimum frequency $f_{min}$, the amplitude of the vibration suddenly increases at a point of time whereat the frequency exceeds a frequency fa which is a frequency higher than the frequency fb, and the ultrasonic motor begins to be driven and thereafter, the amplitude of the vibration decreases gradually.

In the ultrasonic motor shown in FIGS. 4A to 4C, the frequency of the high frequency voltages applied to the piezoelectric elements 11 and 12 can be varied to thereby control the speed of the ultrasonic motor. However, when an attempt is made to drive the ultrasonic motor, for example, at a frequency between the shown frequencies fb and fa, if the frequency is gradually dropped from the maximum frequency $f_{max}$ side, the ultrasonic motor can be driven within the above-mentioned frequency range without any problem, whereas if the frequency is gradually increased from the minimum frequency $f_{min}$ side, the ultrasonic motor remains stopped within the above-mentioned frequency range as shown in FIG. 7. Accordingly, when for example, in an attempt to drive the ultrasonic motor at the resonance frequency, the frequency of the high frequency voltages are variously varied to effect the retrieval of the resonance frequency, there is the possibility that in some cases, the frequency may be dropped too much and the ultrasonic motor may become unable to be started.

Further, FIG. 18 of the accompanying drawings is a perspective view showing an example of an ultrasonic actuator of the longitudinal and torsional vibration type according to the prior art.

In an ultrasonic actuator of this kind, a stator 201 (see FIG. 19) is such that a piezoelectric element 204 for torsional vibration is interposed between two vibrators 202 and 203 of the cylinder type and a piezoelectric element 205 (see FIG. 19) for longitudinal vibration is disposed on the upper side of the vibrator 203. The piezoelectric element 204 for torsional vibration is polarized circumferentially thereof, and the piezoelectric element 205 for longitudinal vibration is polarized in the direction of the thickness thereof. Further, a rotor 206 is disposed on the upper side of the piezoelectric element 205 for longitudinal vibration.

The vibrators 202, 203 and piezoelectric elements 204, 205 constituting the stator 201 are fixed to a shaft 207 (threadably engaged with the threaded portion of the shaft 207), and the rotor 206 is rotatably provided on the shaft 207 through a ball bearing 208. The tip end of the shaft 207 is threadably engaged by a nut 210 through a spring 209 to thereby bring the rotor 206 into pressure contact with the stator 201.

The piezoelectric element 204 for torsional vibration and the piezoelectric element 205 for longitudinal vibration are driven by a voltage of the same frequency oscillated by an oscillator 211 which is phase-controlled by a phase device 212.

The piezoelectric element 204 for torsional vibration gives mechanical displacement for the rotor 206 to rotate, and the piezoelectric element 205 for longitudinal vibration performs the function of synchronizing a frictional force working between the stator 201 and the rotor 206 with the period of the torsional vibration by the piezoelectric element 204 and periodically fluctuating it, thereby converting vibration into motion in one direction.

FIG. 19 of the accompanying drawings is a developed perspective view showing the stator of the ultrasonic actuator according to the prior art.

The piezoelectric element 204 for torsional vibration need be polarized circumferentially thereof and therefore, As shown in FIG. 18, a piezoelectric material has once been divided into six to eight sector-shaped small pieces, and each small piece has been polarized, whereafter the small pieces have been again combined into an annular shape. The reference character 204a designates an electrode.

However, in the aforedescribed prior-art ultrasonic actuator, it has been difficult to yield shape accuracy when the piezoelectric elements for torsional vibration are combined into an annular shape.

On the other hand, the areas of the piezoelectric elements for longitudinal vibration and for torsional vibration have been substantially equal to or smaller than the cross-sectional area of the stator. Also, in order to pass a shaft through the piezoelectric elements, it has been necessary to form a hole in the central portions of the piezoelectric elements. Therefore, the areas of the piezoelectric elements have become smaller and it has been difficult to obtain high torque and high-speed rotation of the motor.

In order to solve such problems, applicant has already proposed an ultrasonic actuator of the longitudinal and torsional vibration type which can be driven by high torque and high-speed rotation and moreover is simple in structure and simple to manufacture (Japanese Patent Application No. 6-180279).

The stator of this ultrasonic actuator of the longitudinal and torsional vibration type is of a construction which comprises a thick resilient member divided into semicircular tubular shapes, and electro-mechanical conversion elements for torsional vibration and longitudinal vibration joined to the divided surfaces of the resilient member (see FIGS. 12A and 12B of the accompanying drawings). The rotor of the ultrasonic actuator is disposed on the end surface (driving surface) of the stator for rotation about a shaft and is brought into pressure contact with the driving surface. When each electromechanical conversion element is excited by the application of a driving signal thereto, torsional vibration and longitudinal vibration are created in the resilient member. When the resonance frequencies of the longitudinal vibration and torsional vibration substantially coincide with each other, longitudinal vibration and torsional vibration are created at a time (degeneration), elliptical motion is created in the driving surface and a drive force is generated, whereby the rotor is rotated.

In any of the aforedescribed ultrasonic actuators of the axial and torsional vibration type, the axial vibration serves as a clutch for the stator and rotor and the torsional vibration serves to impact a rotational force to the rotor and therefore, when the rotor is to be driven, it is driven by the vicinity of the resonance frequency of the torsional vibration.

FIG. 17 of the accompanying drawings is a waveform graph for illustrating a case where the resonance frequencies of the longitudinal vibration and torsional vibration of the ultrasonic actuator of the longitudinal and torsional vibration type deviate from each other.

In this ultrasonic actuator, there is a case where when the resonance frequency $\omega_{0L}$ of the longitudinal vibration is greater than the resonance frequency $\omega_{0T}$ of the torsional vibration, the frequency creating the torsional vibration and driving the actuator becomes smaller than the resonance frequency of the longitudinal vibration.

This ultrasonic actuator can be stably driven at a frequency higher than the resonance frequency, but the stable driving thereof is difficult at a frequency lower than the resonance frequency. Accordingly, if the frequency becomes smaller than the resonance frequency $\omega_{0L}$ of the longitudinal vibration when the ultrasonic actuator is being driven by the driving frequency range of the torsional vibration, the longitudinal vibration may become unable to serve as a clutch for the stator and rotor. This has led to the problem that rotational motion becomes unstable and along therewith, the drive force and driving efficiency are reduced.

On the other hand, such an ultrasonic actuator has generally been designed such that the resonance frequencies $\omega_{0L}$ and $\omega_{0T}$ of the longitudinal vibration and torsional vibration are made coincident with each other.

However, the actually manufactured resilient member has been such that the resonance frequencies of the longitudinal vibration and torsional vibration deviate from each other and the resonance frequency of the longitudinal vibration becomes higher or the resonance frequency of the torsional vibration becomes higher.

Accordingly, the prior-art ultrasonic actuator has suffered from the problem that depending on the manufacture thereof, there is a case where stable driving is obtained and there is a case where stable driving is not obtained, and this gives birth to an individual difference in performance.

SUMMARY OF THE INVENTION

It is an object of the present invention to provide an ultrasonic motor in which the resonance frequency of a first vibration mode vibrating in the direction of the relative motion of a rotor is made equal to or greater than the resonance frequency of a second vibration mode vibrating in a direction differing from the direction of the relative motion of the rotor, thereby driving the ultrasonic motor stably.

It is another object of the present invention to provide an ultrasonic actuator in which stable driving is obtained and which is improved in drive force and driving efficiency and which can reduce an individual difference in performance.

The present invention is applied to an ultrasonic motor having a stator vibrating in conformity with a frequency voltage and a mover effecting relative motion in conformity with the vibration of the stator, and the stator is designed to have a first vibration mode vibrating in the direction of the relative motion of the mover and a second vibration mode vibrating in a direction orthogonal to the direction of the relative motion of the mover, and the resonance frequency of the first vibration mode is made equal to or greater than the resonance frequency of the second vibration mode, whereby the above objects are achieved.

The ultrasonic motor of the present invention has electromechanical conversion elements vibrating in conformity with a frequency voltage, and a resilient member effecting longitudinal vibration and bending vibration including harmonic components, and of the longitudinal vibration including the harmonic component, the resonance frequency of the nth-order longitudinal vibration is made equal to or greater than the resonance frequency of the mth-order bending vibration of the bending vibration including the harmonic component.

Further, in the ultrasonic motor of the present invention, the thickness of the resilient member is made small so that the resonance frequency of the nth-order longitudinal vibration may be equal to or greater than the resonance frequency of the mth-order bending vibration.

Further, in the ultrasonic motor of the present invention, the longitudinal length and thickness of the resilient member are adjusted so that the ratio between the longitudinal length and thickness of the resilient member may be smaller than the ratio when the resonance frequency of the nth-order longitudinal vibration and the resonance frequency of the mth-order bending vibration coincide with each other.

Further, in the ultrasonic motor of the present invention, provision is made of voltage adjusting means for adjusting the frequency of the frequency voltage so that the resilient member may vibrate at or above the resonance frequency of the nth-order longitudinal vibration.

Further, in the ultrasonic motor of the present invention, the resonance frequency of the 1st-order longitudinal vibration is made equal to or greater than the resonance frequency of the (2×k)th-order bending vibration (k being an integer greater than 0).

In the present invention, the resonance frequency of the first vibration mode of the stator is made equal to or greater than the resonance frequency of the second vibration mode of the stator and therefore, if the stator is vibrated by a frequency voltage of a frequency equal to or greater than the resonance frequency of the first vibration mode, the ultrasonic motor will be driven stably.

In the present invention, the resonance frequency of the nth-order longitudinal vibration created in the resilient member is made equal to or greater than the resonance frequency of the mth-order bending vibration and therefore, if the electro-mechanical conversion elements are vibrated by a frequency voltage of a frequency equal to or greater than the resonance frequency of the nth-order longitudinal vibration, the ultrasonic motor will be driven stably.

In the present invention, the smaller the thickness of the resilient member, the higher becomes the resonance frequency of the bending vibration and therefore, by the thickness of the resilient member being made small, the resonance frequency of the nth-order longitudinal vibration is made equal to or greater than the resonance frequency of the mth-order bending vibration.

In the present invention, the longitudinal length and thickness of the resilient member are adjusted so that the ratio between the longitudinal length and thickness of the resilient member may become smaller than the ratio between the longitudinal length and thickness of the resilient member when the resonance frequency of the nth-order longitudinal vibration and the resonance frequency of the mth-order bending vibration coincide with each other. Thereby, the resonance frequency of the nth-order longitudinal vibration becomes equal to or greater than the resonance frequency of the mth-order bending vibration.

In the present invention, voltage adjusting means are provided, whereby the frequency of the frequency voltage is adjusted so that the resilient member may vibrate at or above the resonance frequency of the nth-order longitudinal vibration.

The present invention is an ultrasonic actuator including an electro-mechanical conversion element for converting electrical energy into mechanical energy and excited by a driving signal, a resilient member to which said electro-mechanical conversion element is joined and in which a drive force is created on a driving surface by nth-order longitudinal vibration and mth-order torsional vibration being created by the excitation of the electro-mechanical conversion element, a relative motion member for contacting with the driving surface of said resilient member and effecting relative motion between itself and the resilient member, and a drive circuit for outputting a driving signal to said electro-mechanical conversion element, characterized in that the resonance frequency of said mth-order torsional vibration is made higher than the resonance frequency of said nth-order longitudinal vibration.

The ultrasonic actuator of the present invention is further characterized in that said nth-order longitudinal vibration is 1st-order longitudinal vibration and said mth-order torsional vibration is 1st-order torsional vibration or 2nd-order torsional vibration.

The ultrasonic actuator of the present invention is further characterized in that said driving signal is set so that said drive circuit may drive by a frequency range higher than the resonance frequency of said mth-order torsional vibration.

In the present invention, the electromechanical conversion element is excited by driving vibration, creates nth-order longitudinal vibration and mth-order torsional vibration in the resilient member, and generates elliptical motion in the driving surface of the resilient member. Thereby, a drive force is created between the resilient member and the relative motion member contacted with the resilient member. When the resilient member side is a stator, the relative motion member becomes a mover and is driven. Also, when the relative motion member side is a stator, the resilient member side becomes a mover and is driven.

At this time, the resonance frequency of the mth-order torsional vibration is made higher than the resonance frequency of the nth-order longitudinal vibration and therefore, driving can be effected always by two frequency ranges of high resonance frequencies and any reduction in the drive force and driving efficiency can be prevented.

Also, by designing such that the resonance frequency of the mth-order torsional vibration is made higher than the resonance frequency of the nth-order longitudinal vibration, it will never happen even if the resonance frequency deviates due to machining tolerance or the like that the resonance frequency of the longitudinal vibration becomes higher than the resonance frequency of the torsional vibration, and an individual difference in performance during manufacture can be reduced.

In the present invention, said nth-order longitudinal vibration is 1st-order longitudinal vibration and said mth-order torsional vibration is 1st-order torsional vibration and therefore, the amplitudes of the respective vibrations can be made great and the drive force can be improved.

In the present invention, design is made such that driving is effected by a frequency range higher than the resonance frequency of said mth-order torsional vibration and therefore, driving can be effected always by two frequency ranges of high resonance frequencies and stable driving can be obtained.

BRIEF DESCRIPTION OF THE DRAWINGS

FIGS. 1A and 1B show the structure of an ultrasonic motor according to the present invention.

FIG. 3 is a block diagram of a control circuit for controlling the driving of the ultrasonic motor of FIGS. 1A and 1B.

FIGS. 13A to 13H illustrate the driving principle of combining the longitudinal vibration and torsional vibration of the resilient member of the ultrasonic actuator according to the embodiment of FIG. 9 to thereby generate elliptical motion in the driving surface of the resilient member.

DESCRIPTION OF THE PREFERRED EMBODIMENTS

FIGS. 1A and 1B show the structure of an ultrasonic motor according to the present invention, FIG. 1A being a view of this ultrasonic motor as it is seen from just above it, and FIG. 1B being a longitudinal cross-sectional view of this ultrasonic motor. FIGS. 5A to 5D show the operation of an ultrasonic motor having the structure of FIGS. 4A to 4C.

Before the ultrasonic motor of the embodiment shown in FIGS. 1A and 1B is described, the principle of the operation of the ultrasonic motor having the structure of FIGS. 4A to 4C will hereinafter be described with reference to FIGS. 5A to 5D. In the following, a high frequency voltage applied to the piezoelectric element 11 of FIGS. 4A to 4C will be called the high frequency voltage A, and a high frequency voltage applied to the piezoelectric element 12 of FIGS. 4A to 4C will be called the high frequency voltage B. Also, in FIGS. 4A to 4C, the piezoelectric elements 11 and 12 are shown as being polarized in the same direction, but they may be polarized in opposite directions.

Figure 4A:
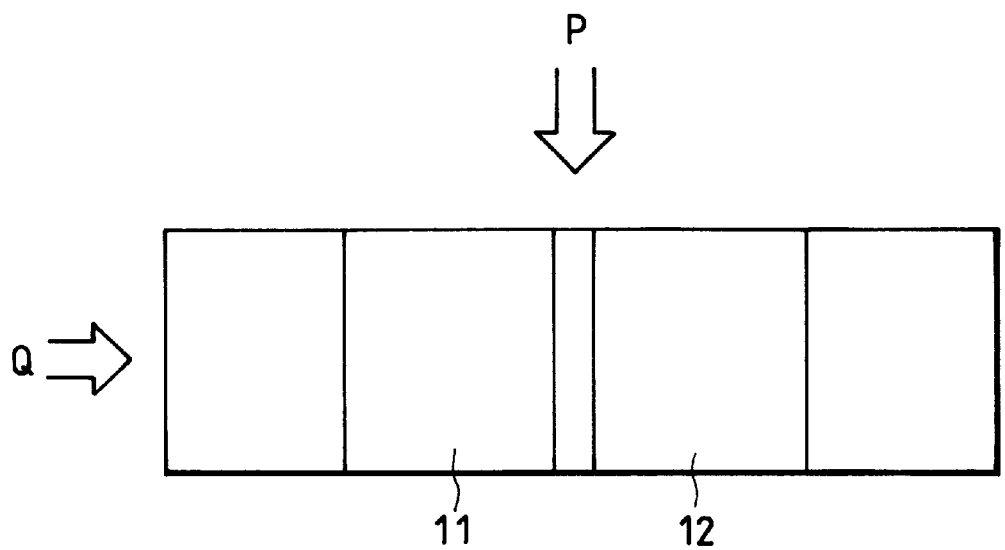
FIGS. 4A to 4C show the structure of an ultrasonic motor according to the prior art.
Figure 4B:
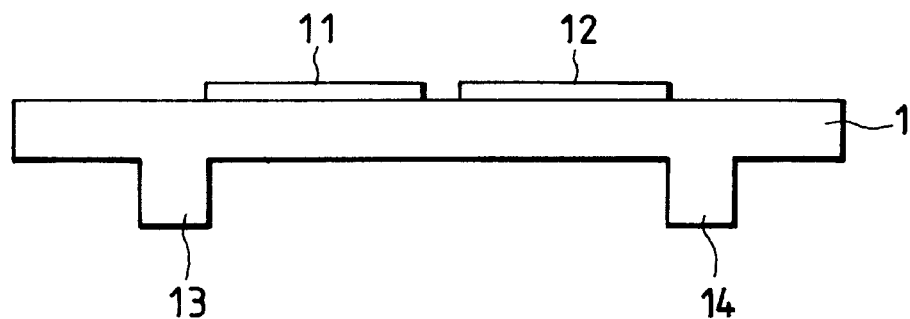
Figure 4C:
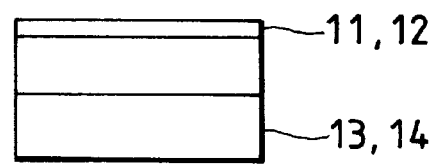

In the ultrasonic motor of FIGS. 4A to 4C, when high frequency voltages are applied to the piezoelectric elements 11 and 12, the piezoelectric elements 11 and 12 vibrate in conformity with the frequencies of the high frequency voltages. These vibrations are transmitted to a resilient member 1, which thus effects bending vibration and longitudinal vibration. Here, the bending vibration refers to the fact that when viewed from the same direction as FIG. 4B, the resilient member 1 vibrates as shown in FIG. 5B, and on the other hand, the longitudinal vibration refers to the fact that when viewed from the same direction as FIG. 4A, the resilient member 1 vibrates as shown in FIG. 5C. The bending vibration and longitudinal vibration created in the resilient member 1 are combined together in the interior of the resilient member 1, and the drive force taking-out portions 13 and 14 of the resilient member effect elliptical vibration by the combination of these vibrations.

Figure 5A:
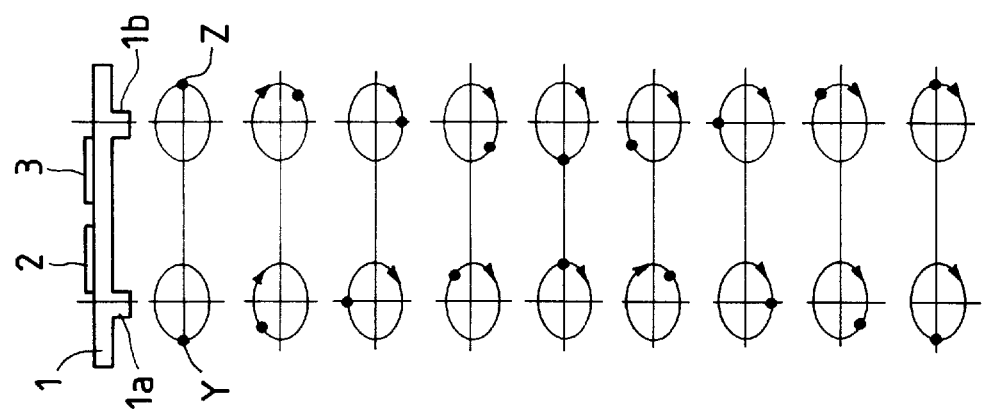
FIGS. 5A to 5D illustrate bending vibration and longitudinal vibration created in the resilient member of the ultrasonic motor of FIGS. 4A to 4C.
Figure 5B:
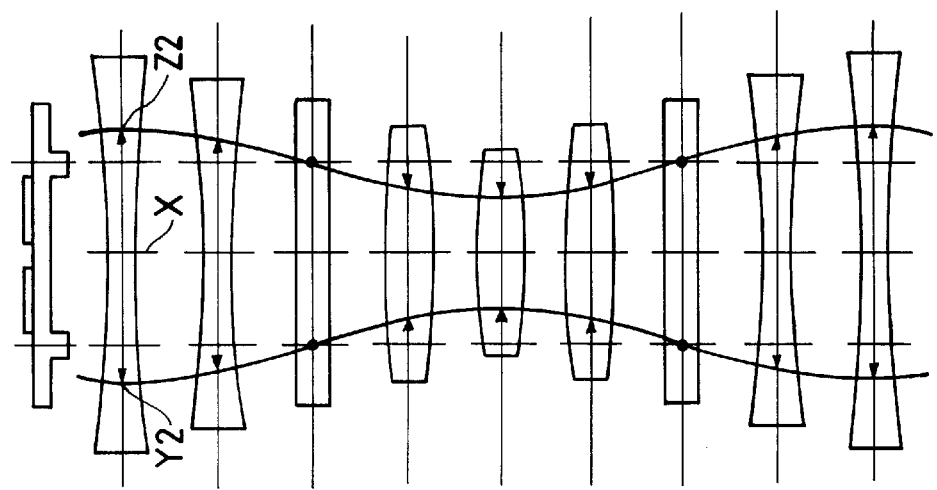
Figure 5C:
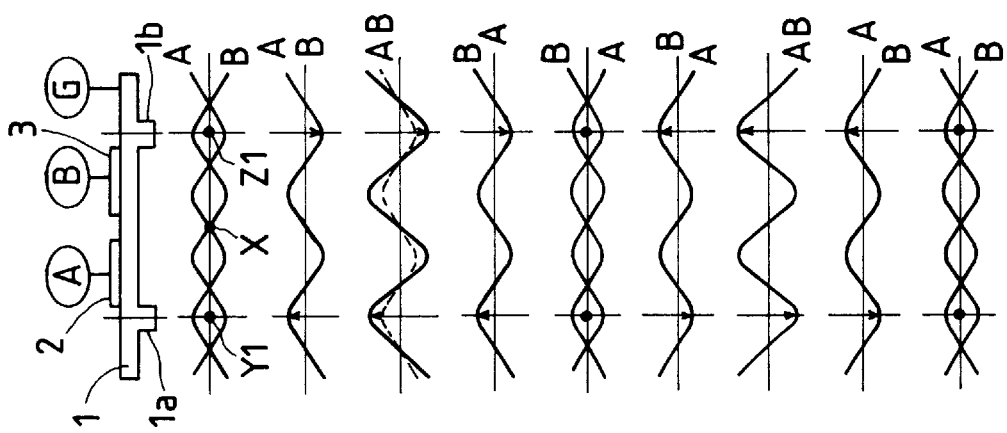
Figure 5D:
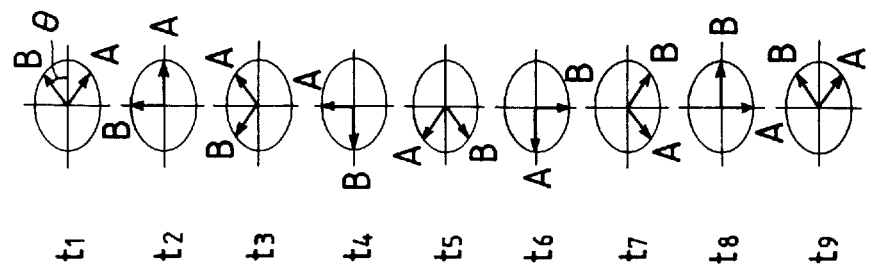

FIG. 5A shows variations with time in the high frequency voltages A and B applied to the piezoelectric elements 11 and 12, respectively, and times t1–t9 shown in FIG. 5A show times differing from one another by $\pi/4$ each. Also, the axis of abscissas of FIG. 5A represents the amplitude values of the high frequency voltages, and the angle $\theta$ of FIG. 5A indicates the phases of the high frequency voltages. On the other hand, FIG. 5B is a waveform graph of the bending vibration created in the resilient member 1, FIG. 5C is a waveform graph of the longitudinal vibration created in the resilient member 1, and FIG. 5D is a waveform graph of the elliptical vibrations of the drive force taking-out portions 13 and 14 of the resilient member 1. FIGS. 5B to 5D are all depicted correspondingly to the times t1–t9 of FIG. 5A.

First, at the time t1, as shown in FIG. 5A, the high frequency voltages A and B which are positive voltages are applied to the piezoelectric elements 11 and 12, respectively. The phase of the bending vibration created in the resilient member 1 by the high frequency voltage A and the phase of the bending vibration created in the resilient member 1 by the high frequency voltage B differ from each other by $\pi/2$ and therefore, these bending vibrations negate each other and no bending vibration occurs in the resilient member 1.

In FIG. 5B, the amplitudes of the bending vibrations in the drive force taking-out portions 13 and 14 of the resilient member 1 are indicated by mass points Y1 and Z1, respectively, and the amplitudes of these mass points Y1 and Z1 both become 0. Also, at the time t1, the longitudinal vibration acting on the resilient member 1 acts in a direction to stretch the resilient member 1 longitudinally thereof as shown in FIG. 5C. In FIG. 5C, the amplitudes of the longitudinal vibrations in the drive force taking-out portions 13 and 14 are indicated by mass points Y2 and Z2, respectively, and the amount of stretch of the resilient member 1 by the longitudinal vibration becomes maximum at the time t1.

Vibration indicated by a mass point Y resulting from the mass points Y1 and Y2 being combined together is created in the drive force taking-out portions 13 and 14, and vibration indicated by a mass point Z resulting from the mass points Z1 and Z2 being combined together is created in the drive force taking-out portion 14 (see FIG. 5D).

At the time t2, as shown in FIG. 5A, the high frequency voltage A becomes maximum and the high frequency voltage B becomes 0. Therefore, bending vibration created in the resilient member 1 becomes such as shown in FIG. 5B, the mass point Y1 bends in the positive direction and the mass point Z1 bends in the negative direction. Also at the time t2, as at the time t1, longitudinal vibration occurs in a direction to stretch the resilient member 1 longitudinally thereof, but the amount of stretch is smaller than at the time t1 as shown in FIG. 5C. Accordingly, both of the mass points Y and Z move elliptically by 45° clockwisely from the time t1 as shown in FIG. 5D.

At the time t3, as shown in FIG. 5A, the high frequency voltage A becomes a positive voltage and the high frequency voltage B becomes a negative voltage. Therefore, bending vibration created in the resilient member 1 becomes such as shown in FIG. 5B, the amount of bend of the mass point Y1 becomes maximum in the positive direction, and the amount of bend of the mass point Z1 becomes maximum in the negative direction. Also, the longitudinal vibration in this case becomes 0 as shown in FIG. 5C. Accordingly, both of the mass points Y and Z move elliptically by 45° clockwisely from the time t2 as shown in FIG. 5D.

At the time t4, as shown in FIG. 5A, the high frequency voltage A becomes 0 and the high frequency voltage B assumes a negative maximum value. Therefore, bending vibration created in the resilient member 1 becomes such as shown in FIG. 5B, the mass point Y1 bends in the positive direction, and the mass point Z1 bends in the negative direction. Also at the time t4, as shown in FIG. 5C, longitudinal vibration occurs in a direction to shorten the resilient member 1. Accordingly, both of the mass points Y and Z move elliptically by 45° clockwisely from the time t3 as shown in FIG. 5D.

At the time t5, as shown in FIG. 5A, both of the high frequency voltages A and B become negative voltages and therefore, as shown in FIG. 5B, the resilient member 1 does not create bending vibration. Also, in this case, longitudinal vibration occurs in the direction to shorten the resilient member 1, and as shown in FIG. 5C, the amount by which the resilient member is shortened becomes maximum. Accordingly, both of the mass points Y and Z move elliptically by 45° clockwisely from the time t4 as shown in FIG. 5D.

Thereafter, likewise, at the times t6–t9, bending vibration and longitudinal vibration occur in the resilient member 1 and as a result, the mass points Y and Z move elliptically by 45° each clockwisely.

Figure 6:
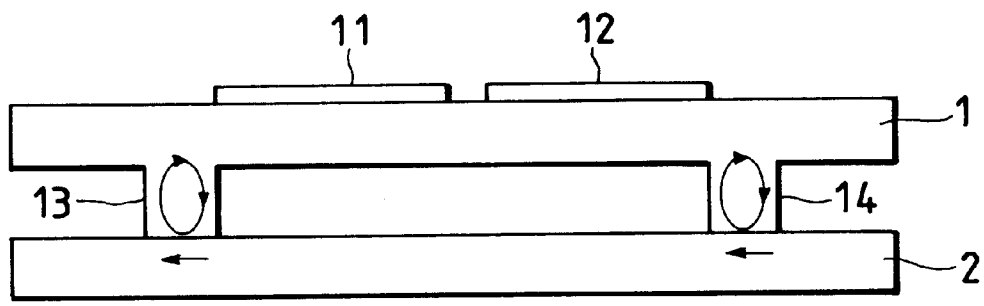
FIG. 6 shows the positional relation between a stator and a rotor.
Figure 7:
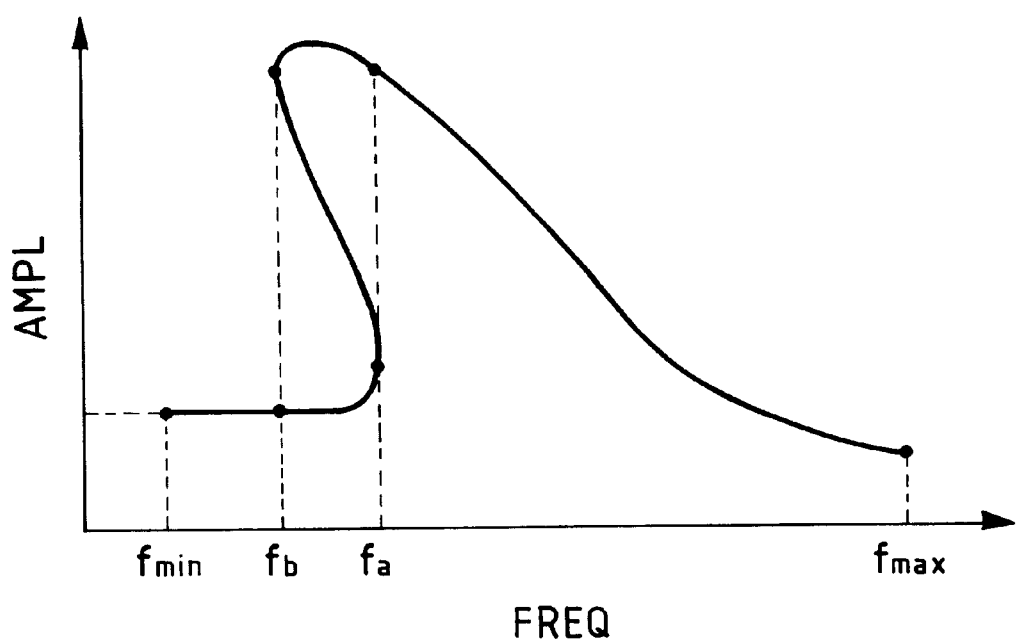
FIG. 7 is a graph showing the relation between the driving frequency of the ultrasonic motor according to the prior art and the amplitude of vibration.

Thus, in the ultrasonic motor of FIGS. 4A to 4C, by the combination of bending vibration and longitudinal vibration created in the resilient member 1, elliptical motion is caused in the drive force taking-out portions 13 and 14 of the resilient member 1. Accordingly, if a rotor 2 as shown, for example, in FIG. 6 is provided at a location which is in contact with the drive force taking-out portions 13 and 14, the rotor 2 can be moved in the direction of the arrow indicated in FIG. 6. Also, when the frequencies of the high frequency voltages applied to the piezoelectric elements 11 and 12 are varied, the frequencies of bending vibration and longitudinal vibration created in the resilient member 1 vary in conformity therewith and therefore, the frequency of the elliptical motion of the drive force taking-out portions 13 and 14 also varies and accordingly, the movement speed of the rotor 2 also varies. That is, in the ultrasonic motor of FIGS. 4A to 4C, by controlling the frequencies of the high frequency voltages applied to the piezoelectric elements 11 and 12, the speed of the ultrasonic motor can be controlled.

Description will hereinafter be made of the ultrasonic motor of the present embodiment shown in FIGS. 1A and 1B. In FIGS. 1A and 1B, constituents common to those of the prior-art ultrasonic motor shown in FIGS. 4A to 4C are given the same reference numerals and in the following, chiefly differences will be described.

In FIGS. 1A and 1B, a resilient member 1A is comprised of a main vibrating portion 1a and drive force taking-out portions 13 and 14, and as the material of the resilient member 1A, use is made of a metal such as stainless steel or an aluminum alloy, or plastic or the like. In FIGS. 1A and 1B, the thickness of the resilient member 1A is t, the longitudinal length of the resilient member 1A is h, and the width of the resilient member 1A is b.

Piezoelectric elements 11 and 12 are adhesively secured to the upper surface of the resilient member 1A as in FIGS. 4A to 4C, and electrodes, not shown, are printed on the upper surfaces of these piezoelectric elements 11 and 12. High frequency voltages A and B are applied to the piezoelectric elements 11 and 12, respectively, through these electrodes, and when the high frequency voltages are applied to the piezoelectric elements 11 and 12, the piezoelectric elements 11 and 12 are polarized in the same direction. Also, the high frequency voltages A and B applied to the piezoelectric elements 11 and 12, respectively, are equal in frequency to each other and differ in phase by π/2 from each other.

In addition, piezoelectric elements 15 and 16 are adhesively secured to the upper surface of the resilient member 1A, and electrodes, not shown, are printed on the upper surfaces of the piezoelectric elements 15 and 16. of these electrodes, the electrode on the piezoelectric element 15 has a ground terminal connected thereto, and this electrode and the upper surface of the resilient member 1A are connected together by electrically conductive paint 4 (see FIG. 3). Therefore, the potential of the upper surface of the resilient member 1A assumes a ground level. Further, the lower surfaces of the piezoelectric elements 11, 12, 15 and 16 are all adhesively secured to the upper surface of the resilient member 1A and therefore, the lower surfaces of the piezoelectric elements 11, 12, 15 and 16 also assume a substantially ground level.

The piezoelectric element 16 converts vibration created in the resilient member 1A into an electrical signal, which is taken out from the electrode on the piezoelectric element 16. The resilient member 1A effects bending vibration and longitudinal vibration as previously described and therefore, a bending vibration component and a longitudinal vibration component are included also in the electrical signal converted by the piezoelectric element 16. Also, the amplitude of the above-mentioned electrical signal varies in conformity with the amplitude of the vibration by the combination of the bending vibration and longitudinal vibration. A stator 3 is constructed of the resilient member 1A and the piezoelectric elements 11, 12, 15, 16, and a rotor 2 is contacted with the drive force taking-out portions 13 and 14 of the lower surface of the resilient member 1A, and an ultrasonic motor is constructed of the rotor 2 and the stator 3.

Figure 2:
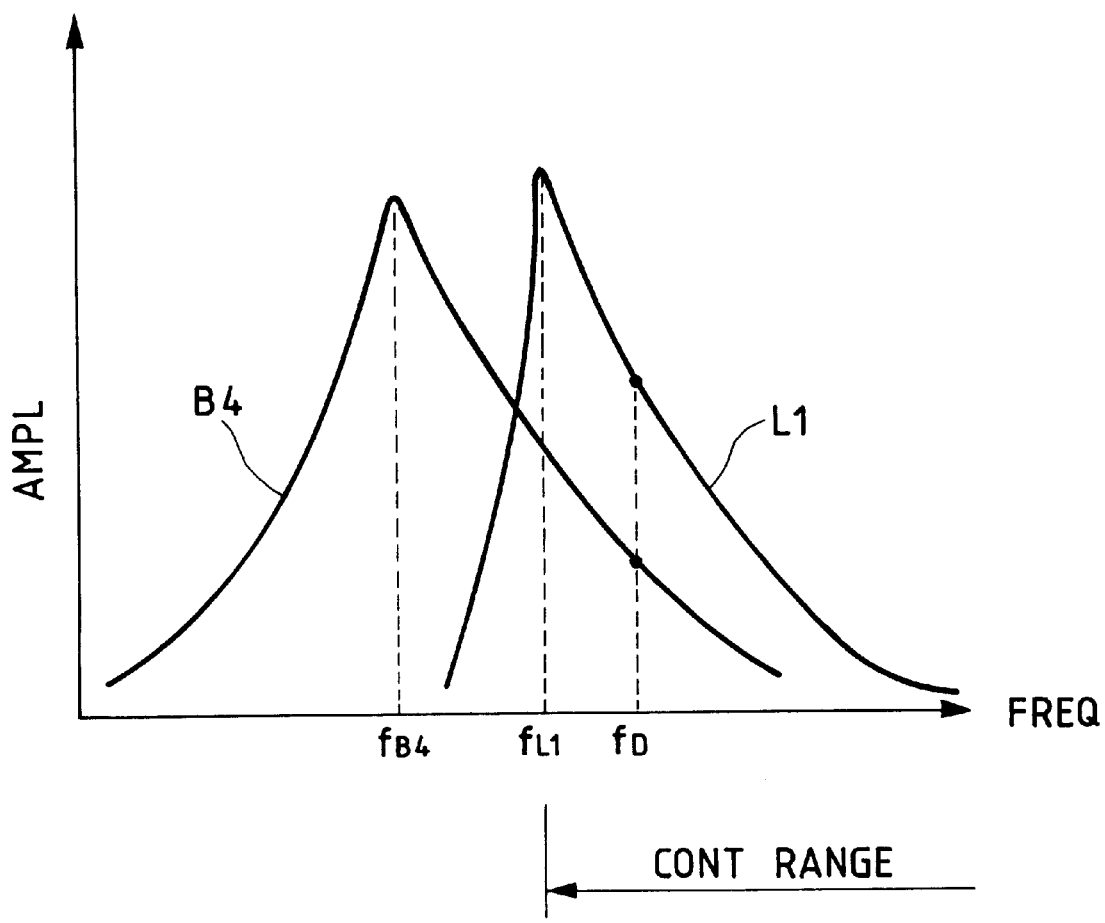
FIG. 2 is a graph showing the relations between the frequencies of bending vibration and longitudinal vibration created in a resilient member and the amplitudes of the vibrations.

FIG. 2 is a graph showing the relation between the frequency and amplitude of the vibration of the resilient member 1A of the ultrasonic motor of the present embodiment. In FIG. 2, a curve L1 indicates a longitudinal vibration curve, and a curve B4 indicates a bending vibration curve. The vibration frequencies of longitudinal vibration and bending vibration created in the resilient member 1A when the high frequency voltages A and B of a predetermined frequency are applied to the piezoelectric elements 11 and 12, respectively, are not limited to one kind, but the resilient member 1A vibrates in a state including a harmonic component. For example, FIG. 5B shows an example in which bending vibration of four periods is effected between the drive force taking-out portions 13 and 14, and such vibration is called 4th-order bending vibration.

The curve L1 in FIG. 2 indicates the vibration curve of longitudinal vibration, and the curve B4 indicates the vibration curve of the 4th-order bending vibration. Also, resonance frequencies at which the vibration amplitudes of the curves L1 and B4 become maximum are indicated by $f_{L1}$ and $f_{B4}$, respectively.

As shown, in the present embodiment, design is made such that the resonance frequency $f_{L1}$ of 1st-order longitudinal vibration created in the resilient member 1A becomes greater than the resonance frequency $f_{B4}$ of 4th-order bending vibration. The reason for this will hereinafter be described.

To control the speed of the ultrasonic motor, the frequency of the high frequency voltages applied to the piezoelectric elements 11 and 12, as previously described, can be varied, but when the frequency of the high frequency voltages becomes equal to or lower than the resonance frequency of the ultrasonic motor, the ultrasonic motor will not be started as previously described or will become stopped from being driven during an overload. Therefore, it is desirable that the ultrasonic motor be driven by a frequency equal to or greater than the resonance frequency.

Also, when as in the present embodiment, the ultrasonic motor is driven by the bending vibration and longitudinal vibration created in the resilient member 1A, it is the longitudinal vibration that actively contributes to the movement of the rotor 2 which is in contact with the resilient member 1A, as shown in FIG. 6. Accordingly, it is desirable that the speed control be effected on the basis of the vibration curve of the longitudinal vibration. However, when the resonance frequency of the bending vibration is higher than the resonance frequency of the longitudinal vibration, the frequency of the high frequency voltages applied to the piezoelectric elements 11 and 12 may sometimes become equal to or lower than the resonance frequency of the bending vibration even if it is equal to or greater than the resonance frequency of the longitudinal vibration, and in such case, there is the possibility that bending vibration is not created.

Therefore, in the present embodiment, the resonance frequency of the 1st-order longitudinal vibration is made higher than the resonance frequency of the 4th-order bending vibration. If this is done, the frequency of the high frequency voltages applied to the piezoelectric elements 11 and 12 is set to a frequency equal to or greater than the resonance frequency of the 1st-order longitudinal vibration, whereby that frequency can be made equal to or greater than the resonance frequency of the 4th-order bending vibration, and the ultrasonic motor is driven stably.

Expression (1) below is an expression showing the relation among the thickness t, the length h, longitudinal elastic modulus E and density $\rho$ of the resilient member and the resonance frequency $f_{B4}$ of the 4th-order bending vibration, and expression (2) below is an expression showing the relation among the length h, longitudinal elastic modulus E and density $\rho$ of the resilient member and the resonance frequency $f_{L1}$ of the 1st-order longitudinal vibration.

$$f_{B4} = \frac{14.137}{2\pi h^2} \cdot \left(\frac{E}{\rho}\right)^{1/2} \cdot \frac{t}{\sqrt{12}} \qquad (1)$$

$$f_{L1} = \frac{1}{2h} \cdot \left(\frac{E}{\rho}\right)^{1/2} \qquad (2)$$

When in expression (1), the thickness t of the resilient member 1A is made small, the resonance frequency of the 4th-order bending vibration can be made high. On the other hand, as shown in expression (2), the resonance frequency of the 1st-order longitudinal vibration does not depend on the thickness t of the resilient member 1A. Accordingly, if the thickness t of the resilient member 1A is made small, the resonance frequency of the 1st-order longitudinal vibration can be made higher than the resonance frequency of the 4th-order bending vibration.

Also, a condition for the resonance frequency of the 1st-order longitudinal vibration shown in expression (2) to become equal to or greater than the resonance frequency of the 4th-order bending vibration shown in expression (3) is found as follows on the basis of expressions (1) and (2).

$$\frac{t}{h} \leq \frac{(\sqrt{12})\pi}{14.137} \qquad (3)$$

If the thickness t and length h of the resilient member 1A are adjusted so as to satisfy the relation of expression (3), the resonance frequency of the 1st-order longitudinal vibration can be made higher than the resonance frequency of the 4th-order bending vibration.

Thus, to make the resonance frequency of the 1st-order longitudinal vibration higher than the resonance frequency of the 4th-order bending vibration, the thickness t of the resilient member 1A can be made small, or the thickness t and length h of the resilient member 1A can be adjusted so as to satisfy the relation of expression (3).

To find the resonance frequencies $f_{B4}$ and $f_{L1}$ with good accuracy, it is necessary to take the influences of the kind of the piezoelectric elements 11 and 12 and the shape of the drive force taking-out portions 13 and 14 into account, and the expression therefor will become considerably more complicated than expressions (1) and (2). So, in accordance with an expression taking various influences into account, instead of expressions (1) and (2), the shape or the like of the resilient member 1A may be determined so that the resonance frequency of the 1st-order longitudinal vibration may become higher than the resonance frequency of the 4th-order bending vibration.

FIG. 3 is a block diagram of an embodiment of a control circuit for controlling the driving of the ultrasonic motor shown in FIGS. 1A and 1B. In FIG. 3, the reference numeral 101 designates a transmitter outputting a high frequency signal of the same frequency as the frequency of the high frequency voltages applied to the piezoelectric elements 11 and 12. The reference numeral 102 denotes an initial setting unit for memorizing the frequency information or the like of the high frequency signal outputted from the transmitter 101 immediately after the closing of a power source switch. The reference numeral 103 designates a first amplifier for amplifying the high frequency signal outputted from the transmitter 101 and outputting a high frequency voltage B, the reference numeral 104 denotes a phase shifter for shifting the phase of the high frequency signal outputted from the transmitter 101 by $\pi/2$, and the reference numeral 105 designates a second amplifier for amplifying the high frequency signal outputted from the phase shifter 104 and outputting a high frequency voltage A.

The reference numeral 106 denotes a phase difference output circuit for detecting the phase difference between the high frequency voltage B outputted from the first amplifier 103 and the electrical signal outputted from the piezoelectric element 16. The reference numeral 107 designates a reference phase difference output circuit for memorizing the reference value of the phase difference between the high frequency voltage B and the above-mentioned electrical signal. The output of the phase difference output circuit 106 and the output of the reference phase difference output circuit 107 are both inputted to a comparator 108 and are compared with each other. The result of the comparison by the comparator 108 is inputted to the transmitter 101, and the frequency of the transmitter 101 is feedback-controlled so that the result of the comparison by the comparator 108 may coincide.

The operation of the control circuit of FIG. 3 will hereinafter be described. When a power source switch, not shown, is closed, the initial driving frequency memorized in the initial setting unit 102 is inputted to the transmitter 101. The resonance frequencies of the vibration curves shown in FIG. 2 are varied in some cases by a variation with time, ambient temperature, etc. and therefore, a frequency sufficiently higher than the resonance frequencies is set as the initial driving frequency so that the initial driving frequency may not become equal to or lower than the resonance frequencies even if the resonance frequencies are varied.

The high frequency signal outputted from the transmitter 101 is amplified by the first amplifier 103 and is applied as the high frequency voltage B to the piezoelectric element 12. Also, the signal outputted from the transmitter 101 has its phase shifted by $\pi/2$ by the phase shifter 104, whereafter it is amplified by the second amplifier 105 and is applied as the high frequency voltage A to the piezoelectric element 11. Thereby, the piezoelectric elements 11 and 12 effect vibration conforming to the frequencies of the high frequency voltages A and B, and this vibration is converted into an electrical signal by the piezoelectric element 16 and the electrical signal is inputted to the phase difference output circuit 106. The high frequency voltage B is also inputted to the phase difference output circuit 106, and the phase difference between the two is outputted from the phase difference output circuit 106. The output of the phase difference output circuit 106 is inputted to the comparator 108 and is compared thereby with the reference value outputted from the reference phase difference output circuit 107, and the result of the comparison is inputted to the transmitter 101. The transmitter 101 adjusts the frequency of the high frequency signal so that the result of the comparison by the comparator 108 may coincide, that is, the phase of the high frequency voltage B and the phase of the electrical signal outputted from the piezoelectric element 16 may coincide with each other. Thereby, the resilient member 1A is stably vibrated with a predetermined vibration amplitude.

Here, when the frequencies of the high frequency voltages applied to the piezoelectric elements 11 and 12 are equal to or lower than the resonance frequency of the 1st-order longitudinal vibration, the driving of the ultrasonic motor may be stopped as previously described and therefore, it is desirable that a desired reference value be set in the reference phase difference output circuit 107 so that the frequencies of the high frequency voltages may not be equal to or lower than the resonance frequency of the longitudinal vibration.

Also, a plurality of different reference values for each driving speed of the ultrasonic motor may be stored in the reference phase difference output circuit 107 and one of them and the high frequency voltage B may be compared with each other by the comparator 108. If this is done, the driving speed of the ultrasonic motor can be changed over at multiple stages.

In the above-described embodiment, there has been shown an example in which the piezoelectric elements 11, 12, 15 and 16 are adhesively secured to the resilient member 1A, but instead of the piezoelectric elements, use may be made of any members capable of converting an electrical signal into mechanical vibration, for example, electrostrictive elements vibrating in proportion to the nth power of the applied voltage.

In the above-described embodiment, there has been shown an example in which 1st-order longitudinal vibration and 4th-order bending vibration are created in the resilient member 1A, whereas the vibration mode is not restricted to the embodiment, but for example, for every combination of nth-order longitudinal vibration and 2mth bending vibration (n and m being an integer greater than 0), the present embodiment can be applied.

In the above-described embodiment, description has been made of an ultrasonic motor in which a stator comprised of a resilient member and piezoelectric elements is fixed and a rotor is moved, but conversely, the rotor may be fixed and the stator may be moved. Also, the ultrasonic motor according to the present invention may be one driven on a straight line or one rotatively driven.

In the above-described embodiment, two drive force taking-out portions 13 and 14 are provided on the resilient member 1A, but the number of the drive force taking-out portions is not limited to that in the embodiment. The number of the piezoelectric elements provided on the resilient member is not limited to that in the embodiment. Further, the shapes and materials of the resilient member and piezoelectric elements are not limited to those in the embodiment.

In the control circuit of FIG. 3, the phase of the high frequency voltage B and the phase of the output of the piezoelectric element 16 are compared with each other by the phase difference output circuit 106, but alternatively, the phase of the high frequency voltage A and the phase of the output of the piezoelectric element 16 may be compared with each other.

When the speed is to be controlled by the control circuit of FIG. 3, the reference voltage of the reference phase difference output circuit 106 may be adjusted so that the frequencies of the high frequency voltages applied to the piezoelectric elements 11 and 12 may always coincide with the resonance frequency of the longitudinal vibration of the resilient member 1A.

In the above-described embodiments, description has been made of an example in which the shape of the resilient member is changed, whereby the resonance frequency of the 1st-order longitudinal vibration is made higher than the resonance frequency of the 4th-order bending vibration, whereas the means for changing the resonance frequency is not limited to that in the embodiment, but for example, the shape or number of the piezoelectric elements may be changed or the materials of the resilient member and the piezoelectric elements may be changed.

In the thus constructed embodiment, the resilient member 1A corresponds to the stator, the rotor 2 corresponds to the mover, the piezoelectric elements 11, 12, 15 and 16 correspond to the electro-mechanical conversion elements, and the reference phase difference output circuit 107 and comparator 108 correspond to the voltage adjusting means.

As described above in detail, according to the present invention, the resonance frequency of the first vibration mode vibrating in the direction of the relative motion of the mover is made equal to or greater than the resonance frequency of the second vibration mode vibrating in a direction orthogonal to the direction of the relative motion of the mover and therefore, if the frequencies of the frequency voltages are made equal to or greater than the resonance frequency of the first vibration mode, the ultrasonic motor can be driven stably.

According to the present invention, the resonance frequency of the nth-order longitudinal vibration created in the resilient member is made equal to or greater than the resonance frequency of the mth-order bending vibration and therefore, if the frequencies of the frequency voltages applied to the electro-mechanical conversion elements are made equal to or greater than the resonance frequency of the nth-order longitudinal vibration, the ultrasonic motor can be driven stably.

According to the present invention, the length and thickness of the resilient member are adjusted so that the ratio between the length and thickness of the resilient member may become smaller than the ratio between the longitudinal length and thickness of the resilient member when the resonance frequency of the nth-order longitudinal vibration and the resonance frequency of the bending vibration of the mth-order resonance frequency coincide with each other and therefore, the resonance frequency of the nth-order longitudinal vibration can be made equal to or greater than the resonance frequency of the mth-order bending vibration.

In the present embodiment, design is made such that the frequencies of the frequency voltages applied to the electromechanical conversion elements can be adjusted and therefore, the resilient member can be vibrated at or above the resonance frequency of the nth-order longitudinal vibration.

The present invention will hereinafter be described in detail with respect to some embodiments thereof and with reference to the drawings.

Figure 8:
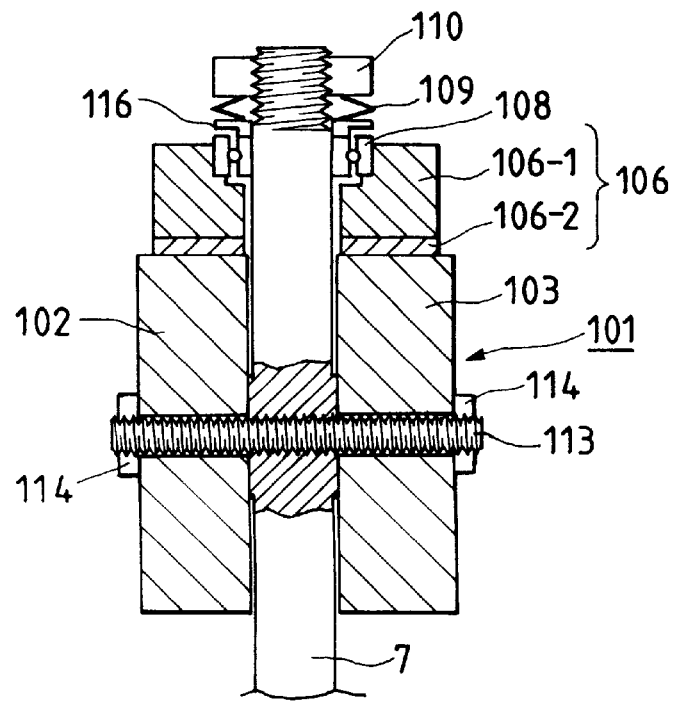
FIG. 8 is a cross-sectional view showing a first embodiment of an ultrasonic actuator according to the present invention.
Figure 9:
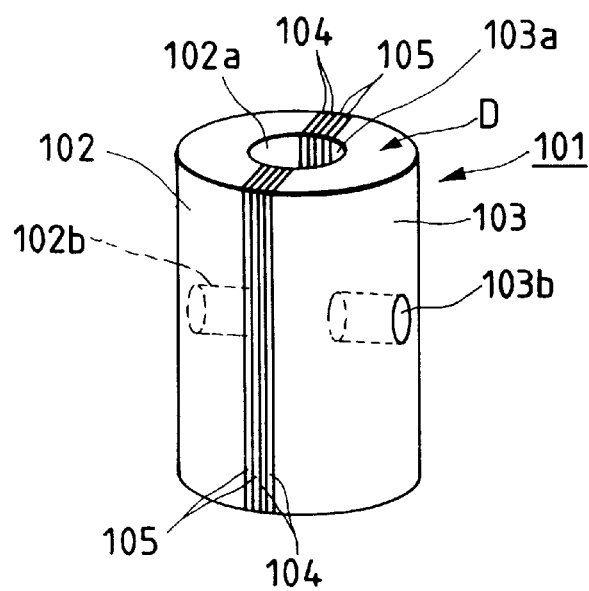
FIG. 9 illustrates the vibrator of an ultrasonic actuator according to an embodiment of the present invention.

FIG. 8 is a cross-sectional view showing an embodiment of an ultrasonic actuator according to the present invention, and FIG. 9 is a perspective view showing the stator of the ultrasonic actuator of FIG. 8.

The stator 101 is comprised of piezoelectric members 104 and 105 which are electro-mechanical conversion elements excited by a driving signal and converting electrical energy into mechanical energy, and resilient members 102 and 103 to which those piezoelectric members 104 and 105 are joined and in which 1st-order longitudinal vibration and 1st-order torsional vibration are created by the excitation of the piezoelectric members 104 and 105, whereby a drive force is generated on a driving surface D.

The resilient members 102 and 103 are members of such a shape that a thick-walled cylinder is longitudinally divided into two, and the piezoelectric members 104 and 105 are interposed between the dividing surfaces thereof. The piezoelectric members 104 and 105 comprise two layers in total, and the piezoelectric member 104 of two layers is a piezoelectric member for torsional vibration having a great piezoelectric constant $d_{15}$, and the piezoelectric member 105 of the remaining two layers is a piezoelectric member for longitudinal vibration having a great piezoelectric constant $d_{31}$.

The resilient members 102 and 103 have through-holes 102b and 103b formed substantially at the center in the height direction thereof and in parallelism to the direction of lamination of the piezoelectric members 104 and 105 (see FIG. 9). These resilient members 102 and 103 are fixed by a bolt 113 and nuts 114 by the use of the holes 102b and 103b, thereby sandwiching the piezoelectric members 104 and 105 therebetween, and are fixed to a fixing shaft 107 inserted into the axial center.

A mover 106 is comprised of a mover base metal 106-1 and a sliding material 106-2 which is in contact with the driving surface D of the stator 101, and is positioned relative to the fixing shaft 107 by a positioning member 108 such as a bearing fitted to the inner peripheral portion of the mover.

Also, the mover 106 is brought into pressure contact with the driving surface D of the stator 101 by a pressing member 109 such as a belleville spring, a spring or a leaf spring.

The fixing shaft 107 extends through hollow portions 102a and 103a formed axially of the resilient members 102 and 103, and is for fixing the stator 101 comprising the resilient members 102, 103, etc. and at the same time, positioning the mover 106 radially thereof. This fixing shaft 107 has a threaded portion formed at the tip end thereof, and is provided with an adjusting member 110 such as a nut for adjusting the amount of pressure of the pressing member 109.

Figure 10A:
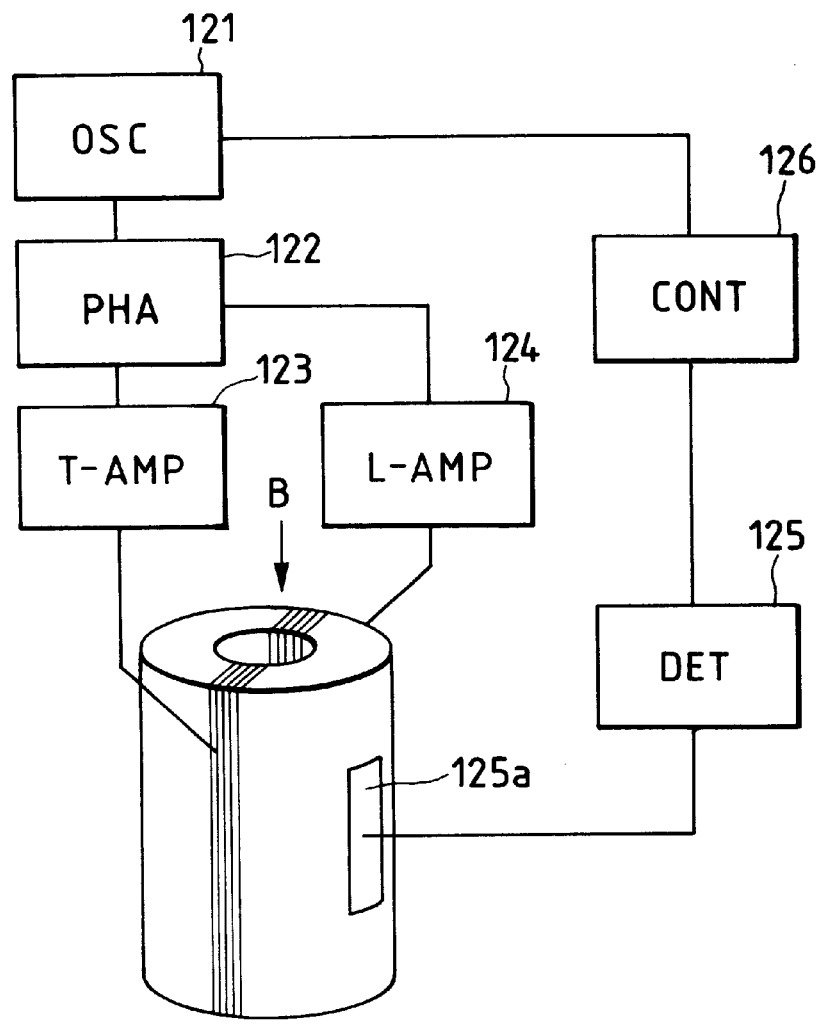
FIGS. 10A and 10B are block diagrams showing the drive circuit of the ultrasonic actuator according to the embodiment of FIG. 9.
Figure 10B:
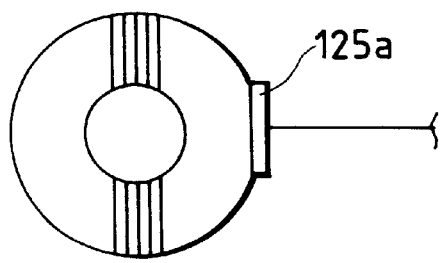

FIGS. 10A and 10B are block diagrams illustrating the drive circuit of the ultrasonic actuator according to the present embodiment.

The drive circuit of this embodiment is comprised of an oscillating portion 121 oscillating a driving signal, a phase shifting portion 122 for dividing the driving signal into signals having a phase difference (¼)λ therebetween, a T-amplifying portion 123 for amplifying the driving signal inputted to the piezoelectric member 104 for torsional vibration, an L-amplifying portion 124 for amplifying the driving signal inputted to the piezoelectric member 105 for longitudinal vibration, etc.

Also, the control circuit is comprised of a detecting portion 125 for detecting torsional vibration, a controlling portion 126 for controlling the frequency, voltage, etc. of the oscillating portion 121 in conformity with the amount of detection of the detecting portion 125, etc. The detecting portion 125 is provided with a piezoelectric member 125a attached to a side surface of the stator 101, and can indirectly detect torsional displacement by detecting displacement resulting from torsion.

Description will now be made of the principle of driving which combines the torsional vibration and longitudinal vibration of the resilient member by the ultrasonic actuator of the present embodiment to thereby generate elliptical motion on the driving surface.

Figure 12A:
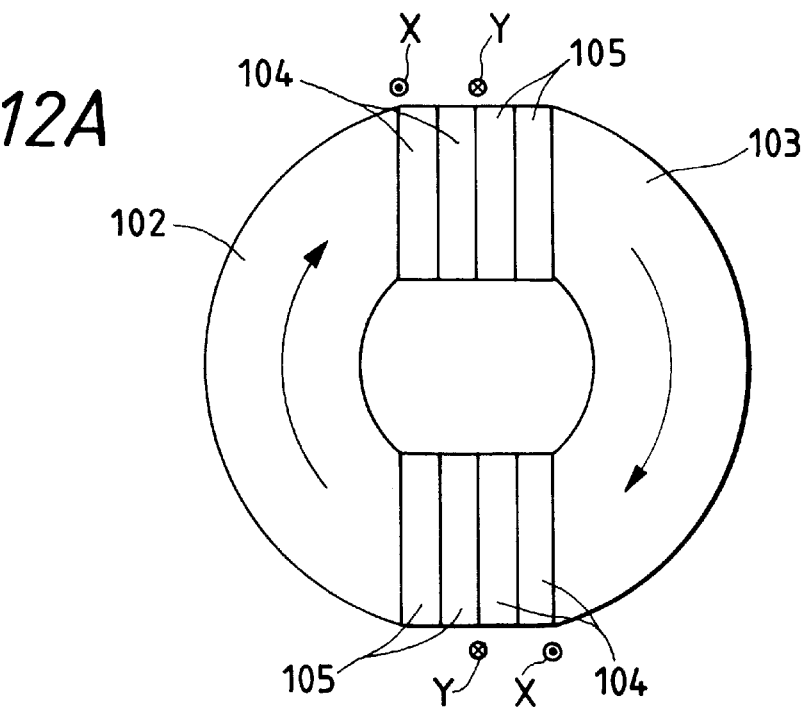
FIGS. 12A and 12B illustrate the resilient member of the ultrasonic actuator according to the embodiment of FIG. 9.
Figure 12B:
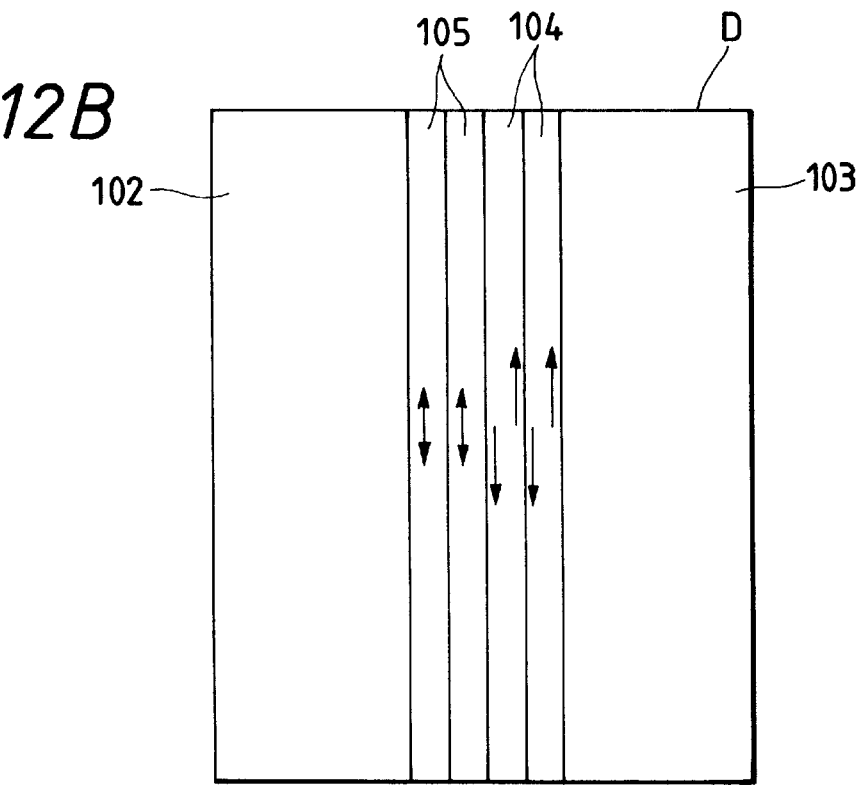

FIGS. 12A and 12B are views of the stator of the ultrasonic actuator according to the present embodiment as it is seen from the bottom surface and the side surface, respectively, thereof.

The piezoelectric elements 104 and 105 comprise two groups interposed between the two resilient members 102 and 103, and each group of the piezoelectric members 104 and 105 comprises four layers, of which two layers are comprised of a piezoelectric member 104 having a great piezoelectric constant $d_{15}$ and the remaining two layers are comprised of a piezoelectric member 105 having a great piezoelectric constant $d_{31}$.

The former piezoelectric element 104 has a great piezoelectric constant $d_{15}$ and creates shear displacement relative to the lengthwise direction of the resilient members 102 and 103. The piezoelectric member 104 is disposed such that in FIG. 12A which is a view of stator as it is seen from its bottom surface, the direction X on this side and the opposite direction Y of shear deformation are alternate relative to the circumferential direction. It will be convenient if at this time, the position at which the piezoelectric member 104 is most shear-deformed toward this side becomes point-symmetrical and the position which it is most shear-deformed toward the opposite side becomes point-symmetrical.

By being thus deformed, when the piezoelectric member 104 is shear-deformed, torsional displacement is created in the stator 101 and the bottom surface thereof becomes twisted.

The latter piezoelectric member 105 has a great piezoelectric constant $d_{31}$ and creates expansion displacement relative to the lengthwise direction of the resilient members 102 and 103. The four piezoelectric members 105 for longitudinal vibration are all disposed so that displacement may occur in the same direction when a certain potential is applied thereto.

As described above, when the piezoelectric member 104 for torsional vibration having a great piezoelectric constant $d_{15}$ and the piezoelectric member 105 for longitudinal vibration having a great piezoelectric constant $d_{31}$ are disposed, a sine wave voltage is inputted to the piezoelectric member 104 for torsional vibration, whereby torsional motion is created in the stator 101 in conformity therewith, and a sine wave voltage is inputted to the piezoelectric member 105 for longitudinal vibration, whereby expanding and contracting motion is created in the stator 101 in conformity therewith.

FIGS. 13A to 13H illustrate that the longitudinal vibration and torsional vibration created in the stator of the ultrasonic actuator according to the present embodiment are combined together to create elliptical motion in the driving surface.

As shown in FIGS. 13A to 13H, when the phase difference between the period of torsional motion and the period of expanding and contracting motion is shifted by $(1/4)\mu$, elliptical motion is created at a point A on the driving surface D.

At a point of time $t=(6/4)\pi$, the displacement of the torsional motion T is maximum toward the left side and the displacement of the longitudinal vibration L is zero. In this state, the mover 106 is brought into contact with the driving surface D of the stator 101 by the pressing member 109.

From this state to $t=(7/4)\pi-0-(2/4)\pi$, the torsional motion T is displaced from the left-hand side maximum to the right-hand side maximum, and the longitudinal vibration L is displaced from zero to the upper side maximum and returns to zero again. Accordingly, the point A on the driving surface D of the stator 101 rotates rightwardly while pushing the mover 106, and the mover 106 is driven.

Next, at $t=(2/4)\pi-(6/4)\pi$, the torsional motion T is displaced from the right-hand side maximum to the left-hand side maximum, and the longitudinal vibration L is displaced from zero to the lower side maximum and returns to zero again. Accordingly, the point A on the driving surface D of the stator 101 rotates leftwardly while separating from the mover 106 and therefore, the mover 106 is not driven. Even if at this time, the mover 106 is pressed by the pressing member 109, the mover 106 differs in natural frequency from the stator 101 and therefore, it cannot follow the contraction of the stator 101.

When the frequency of this torsional vibration is made substantially coincident with the resonance frequency of the torsional vibration and the frequency of the longitudinal vibration is made substantially coincident with the resonance frequency of the longitudinal vibration, resonation takes place and the elliptical motion expands. The approximate expressions of the resonance frequencies of the torsional vibration and longitudinal vibration are shown in the following expressions (4) and (5):

$$\text{Torsional frequency} = L_s \times (G/\rho)^{2}/2 \qquad (4)$$

$$\text{Longitudinal frequency} = L_s + L_r) \times (E/\rho)^{2}/2 \qquad (5)$$

where $L_s$: the length of the stator in the lengthwise direction thereof;

$L_r$: the length of the mover in the lengthwise direction thereof;

E: modulus of longitudinal elasticity;

G: modulus of transverse elasticity;

$\rho$: density.

According to expressions (4) and (5), the resonance frequency of the torsional vibration and the resonance frequency of the longitudinal vibration can be made coincident with each other by adjusting the length of the stator 101 in the lengthwise direction thereof. In the present invention, however, the length of the stator 101 in the lengthwise direction thereof is adjusted so that the resonance frequency of the torsional vibration may be higher than the resonance frequency of the longitudinal vibration.

Examples of the Manufacture

Description will now be made in greater detail with respect to some examples of the manufacture.

An attempt has been actually made to design an ultrasonic actuator using a heteromorphic mode degeneration type vibrator of longitudinal vibration and torsional vibration. The stator 101 is formed of two kinds of materials, i.e., resilient members 102, 103 and piezoelectric members 104, 105 and further, the materials of the stator 101 and mover 106 differ from each other. Here, in order to improve the accuracy of calculation, the resonance frequencies of torsional vibration and longitudinal vibration were found by the finite element method.

Resilient members 102, 103: invar material (nickel alloy of iron origin)

Piezoelectric member 104 for torsional vibration: PZT of a thickness 0.5 mm $d_{15}=510\times10^{-12}$ m/V Piezoelectric member 105 for longitudinal vibration: PZT of a thickness 0.5 mm $d_{31}=-135\times10^{-12}$ m/V Mover 106: aluminum Example 1 of the Manufacture Length of resilient members 102, 103: 20 mm Length of mover 106: 20.6 mm Resonance frequency of longitudinal vibration: 58.6 kHz Resonance frequency of torsional vibration: 59.1 kHz Example 2 of the Manufacture Length of resilient members 102, 103: 20 mm Length of mover 106: 20 mm Resonance frequency of longitudinal vibration: 59.9 kHz Resonance frequency of torsional vibration: 59.1 kHz By thus adjusting the length of the mover in the lengthwise direction thereof, the resonance frequency of torsional vibration could be made higher than the resonance frequency of longitudinal vibration.

The operation of the ultrasonic actuator of this embodiment will now be described.

The oscillating portion 121 oscillates to produce a driver signal, which is divided into two signals having a phase difference of $(1/4)\lambda$ by the phase shifting portion 122, and the two signals are amplified by the T-amplifying portion 123 and the L-amplifying portion 124, respectively.

The driving signal amplified by the T-amplifying portion 123 is inputted to the piezoelectric member 104 for torsional vibration, and the driving signal amplified by the L-amplifying portion 124 is inputted to the piezoelectric member 105 for longitudinal vibration. The longitudinal vibration is directly created by the piezoelectric member 105 for longitudinal vibration, while the torsional vibration is created by the shear deformation of the piezoelectric member 104 for torsional vibration.

However, the thickness of the vibrator cannot be made great from the viewpoint of the structure thereof and therefore, in some cases, the amplitude of the torsional vibration becomes small relative to that of the longitudinal vibration. Accordingly, if the amplification factor of the T-amplifying portion 123 is made greater than that of the L-amplifying portion 124, the difference between the amplitude of the torsional vibration and the amplitude of the longitudinal vibration will become small, and this is convenient.

In the stator 101, 1st-order torsional vibration and 1st-order longitudinal vibration are created by the excitation of the piezoelectric members 104 and 105 when the driving signal is inputted, and elliptical motion resulting from those vibrations being combined together occurs in the driving surface D. The mover 106 is pressed against the driving surface D of the stator 101 and therefore, a drive force is frictionally transmitted from the stator 101 to the mover 106, which is thus driven.

The detecting portion 125 detects the amplitude of the torsional vibration of the stator 101 and outputs a detection signal to the controlling portion 126. The driving speed and driving torque of the mover 106 can be estimated from the amplitude value of the stator 101. Accordingly, the controlling portion 126 controls the driving frequency and voltage of the oscillator of the oscillating portion 121 on the basis of the result of the detection by the detecting portion 125.

The controlling portion 126 effects the control of heightening the driving frequency or making the voltage small when for example, the detected amount is greater than a predetermined value. When conversely the detected amount is smaller than the predetermined value, the controlling portion 126 effects the control of making the driving frequency low or heightening the voltage.

Figure 11:
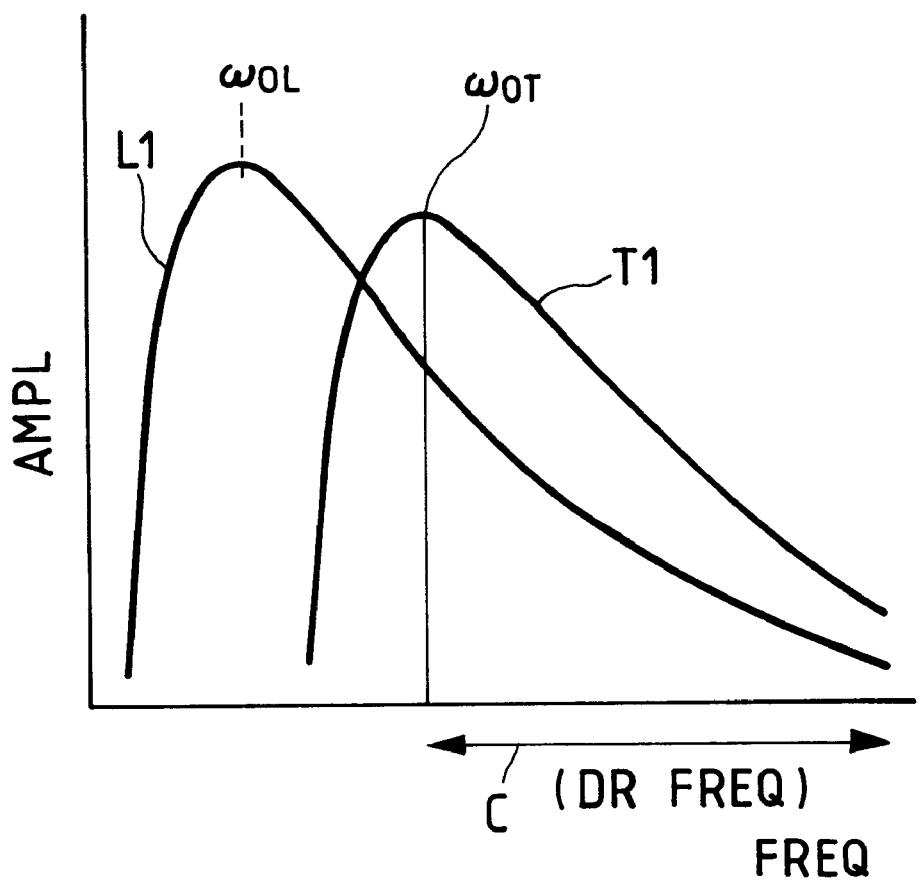
FIG. 11 is a graph showing the relation between the resonance frequencies of the longitudinal vibration and torsional vibration of the ultrasonic actuator according to the embodiment of FIG. 9.

In this embodiment, the resonance frequency of the 1st-order torsional vibration is made higher than the resonance frequency of the 1st-order longitudinal vibration and therefore, the amplitude of the 1st-order torsional vibration and the amplitude of the 1st-order longitudinal vibration become such as shown in FIG. 11.

The longitudinal vibration plays the role of a clutch between the stator 101 and the mover 106, and the torsional vibration serves to impart a rotational force to the mover 106. Accordingly, if the driving frequency range is a frequency range higher than the resonance frequency of the torsional vibration and control is effected by this driving frequency range, the rotational speed and driving torque can be controlled. Since the resonance point $\omega_{0L}$ of the longitudinal vibration does not exist within this driving frequency range C, stable driving is obtained and the drive force and the driving efficiency can be improved.

Comparing the present invention with the conventional designing method of combining the resonance frequencies of longitudinal vibration and torsional vibration, there is the following advantage. In the conventional method, it happens that depending on the machining tolerance, the resonance frequency of longitudinal vibration<the resonance frequency of torsional vibration, or the resonance frequency of longitudinal vibration>the resonance frequency of torsional vibration, and particularly in the latter, the resonance point of longitudinal vibration lies in the driving frequency range and in some cases, stable driving has not been obtained and depending on the machining tolerance, irregularity of performance has occurred.

However, if as in the present embodiment, design is made such that the resonance frequency of longitudinal vibration<the resonance frequency of torsional vibration, a stable driving performance can be obtained within a range in which the relation that the resonance frequency of longitudinal vibration<the resonance frequency of torsional vibration is kept even if the difference between the resonance frequencies of longitudinal vibration and torsional vibration shifts in a direction to become smaller, depending on the machining tolerance, and the individual difference in performance by the machining tolerance can be reduced more than in the prior art.

At this time, the amplitude of longitudinal vibration is often greater than the amplitude of torsional vibration, and even if the resonance frequency of longitudinal vibration and the resonance frequency of torsional vibration are apart to a certain degree, elliptical motion can be created in the driving surface and the mover can be driven.

Figure 15:
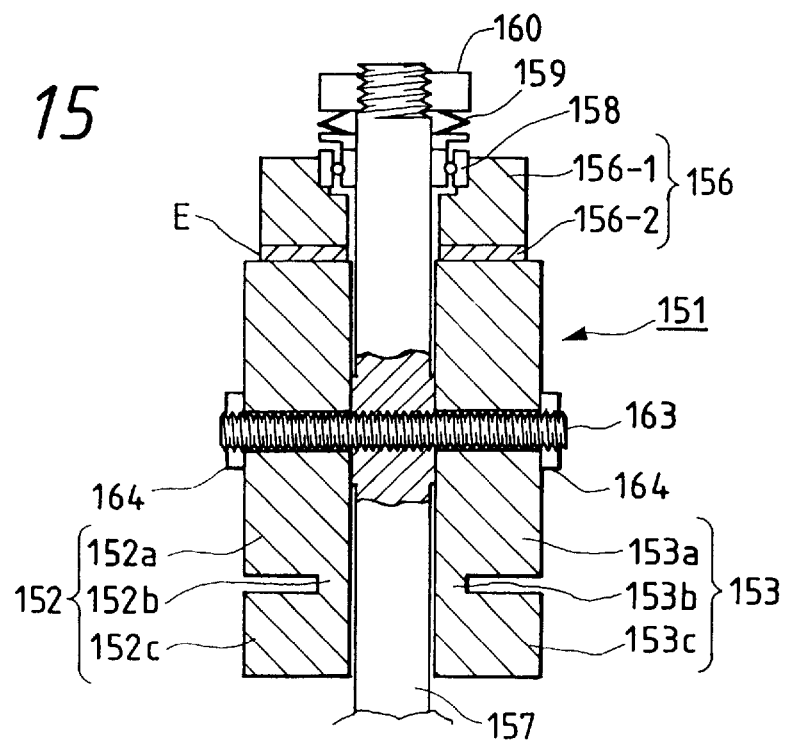
FIG. 15 is a cross-sectional view of an ultrasonic actuator according to another embodiment of the present invention.

FIG. 15 is a cross-sectional view illustrating another embodiment of the ultrasonic actuator according to the present invention.

A stator 151 is comprised of piezoelectric members 154 and 155 (see FIGS. 16A and 16B) which are electromechanical conversion elements excited by a driving signal, and resilient members 152 and 153 to which those piezoelectric members 154 and 155 are joined and in which 1st-order longitudinal vibration and 2nd-order torsional vibration are created by the excitation of the piezoelectric members 154 and 155, whereby a drive force is created in a driving surface E.

The resilient members 152 and 153 are members of a shape in which a thick-walled cylinder is longitudinally divided into two and which have first large-diametered portions 152*a*, 153*a*, second large-diametered portions 152*c*, 153*c* and small-diametered portions 152*b*, 153*b* formed therebetween, and the piezoelectric members 154 and 155 are sandwiched between the divided surfaces. The length of the first large-diametered portions 152*a* and 153*a* is greater than the length of the second large-diametered portions 152*c* and 153*c*. The piezoelectric members 154 and 155 comprise four layers in total, and the piezoelectric member 154 of two layers is a piezoelectric member for torsional vibration having a great piezoelectric constant $d_{15}$, and the piezoelectric element 155 of the remaining two layers is a piezoelectric member for longitudinal vibration having a great piezoelectric constant $d_{31}$.

The resilient members 152 and 153 have through-holes formed substantially at the center of their height direction in parallel to the direction of lamination of the piezoelectric members 154 and 155. These resilient members 152 and 153 are fixed by a bolt 163 and nuts 164 by the use of those through-holes, thereby sandwiching the piezoelectric members 154 and 155 therebetween and being fixed to a fixing shaft 157 inserted into the axial center.

A mover 156 is comprised of a mover base material 156-1 and a sliding material 156-2 contacting with the driving surface of the stator 151, and is positioned relative to the fixing shaft 157 by a positioning member 158 such as a bearing fitted to the inner peripheral portion thereof.

Also, the mover 156 is brought into pressure contact with the driving surface E of the stator 151 by a pressing member 159 such as a belleville spring, a spring or a leaf spring.

The fixing shaft 157 extends through a hollow portion formed axially of the resilient members 152 and 153, and is for fixing the stator 151 comprising the resilient members 152, 153, etc. and at the same time, positioning it radially of the mover 156. This fixing shaft 157 has a threaded portion formed on the tip end thereof, and is provided with an adjusting member 160 such as a nut for adjusting the amount of pressing of the pressing member 159.

Figure 16A:
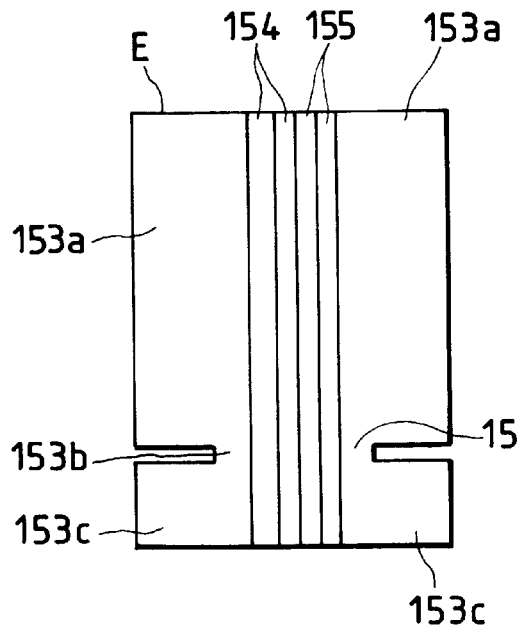
FIGS. 16A and 16B illustrate the vibration modes o the vibrator of the ultrasonic actuator according to the embodiment of FIG. 15.
Figure 16B:
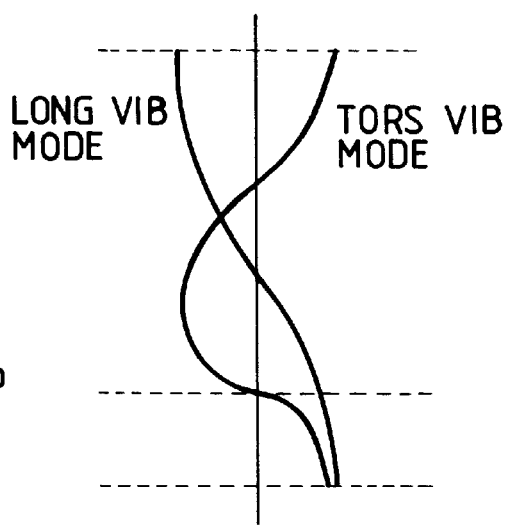
Figure 17:
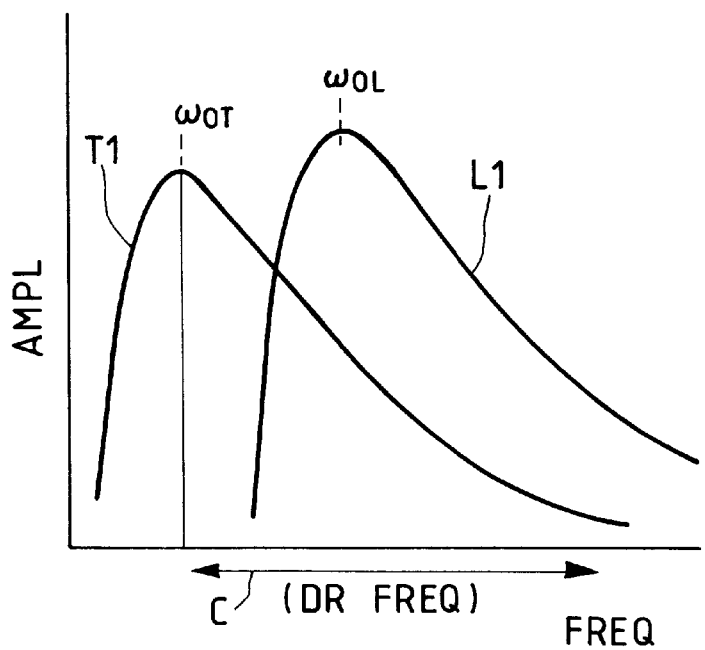
FIG. 17 is a graph illustrating a case where the resonance frequency of the longitudinal vibration has become higher than the resonance frequency of the torsional vibration of an ultrasonic actuator according to the prior art.
Figure 18:
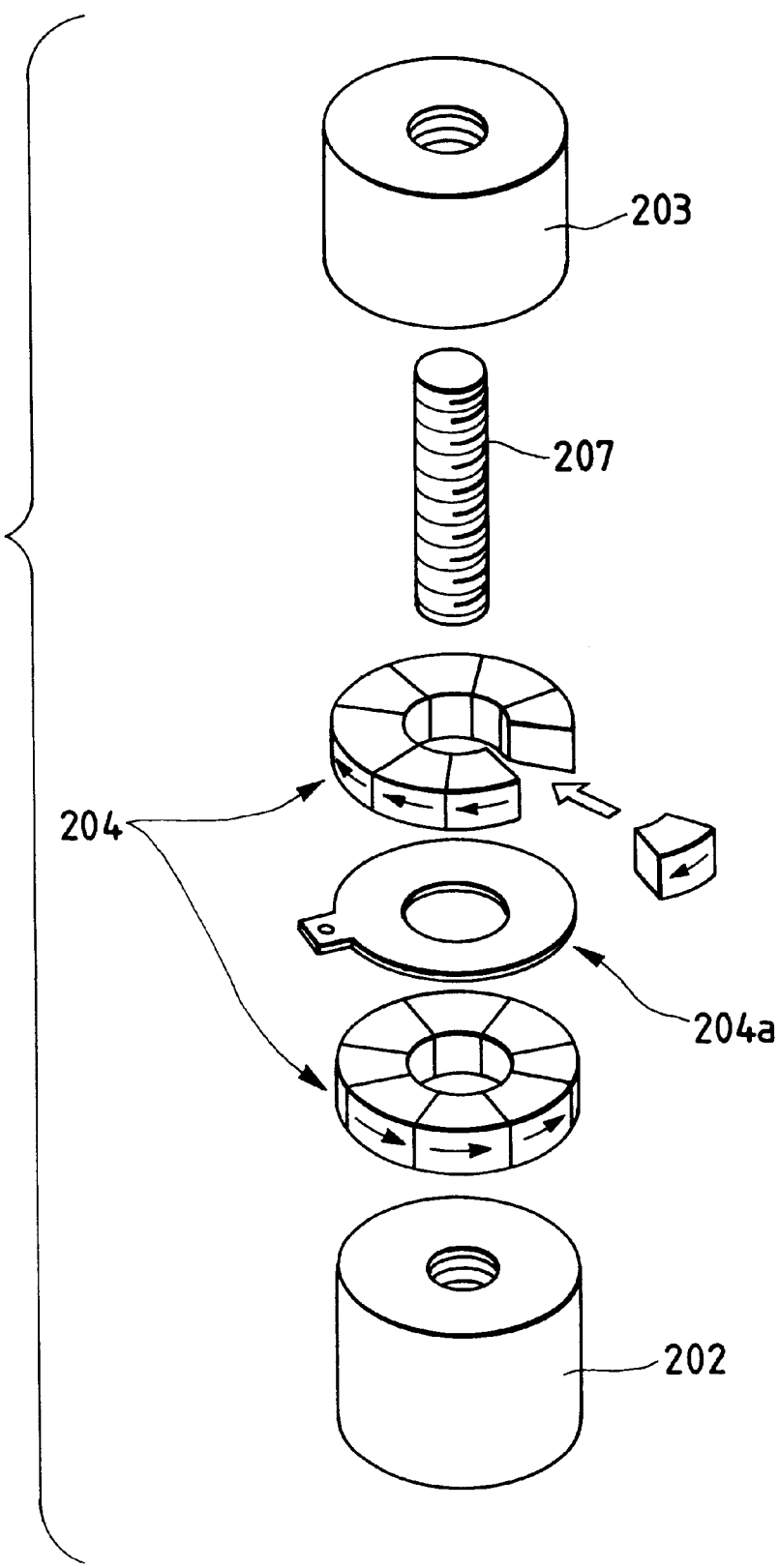
FIG. 18 is a perspective view showing an example of the ultrasonic actuator of the longitudinal and torsional vibration type according to the prior art.
Figure 19:
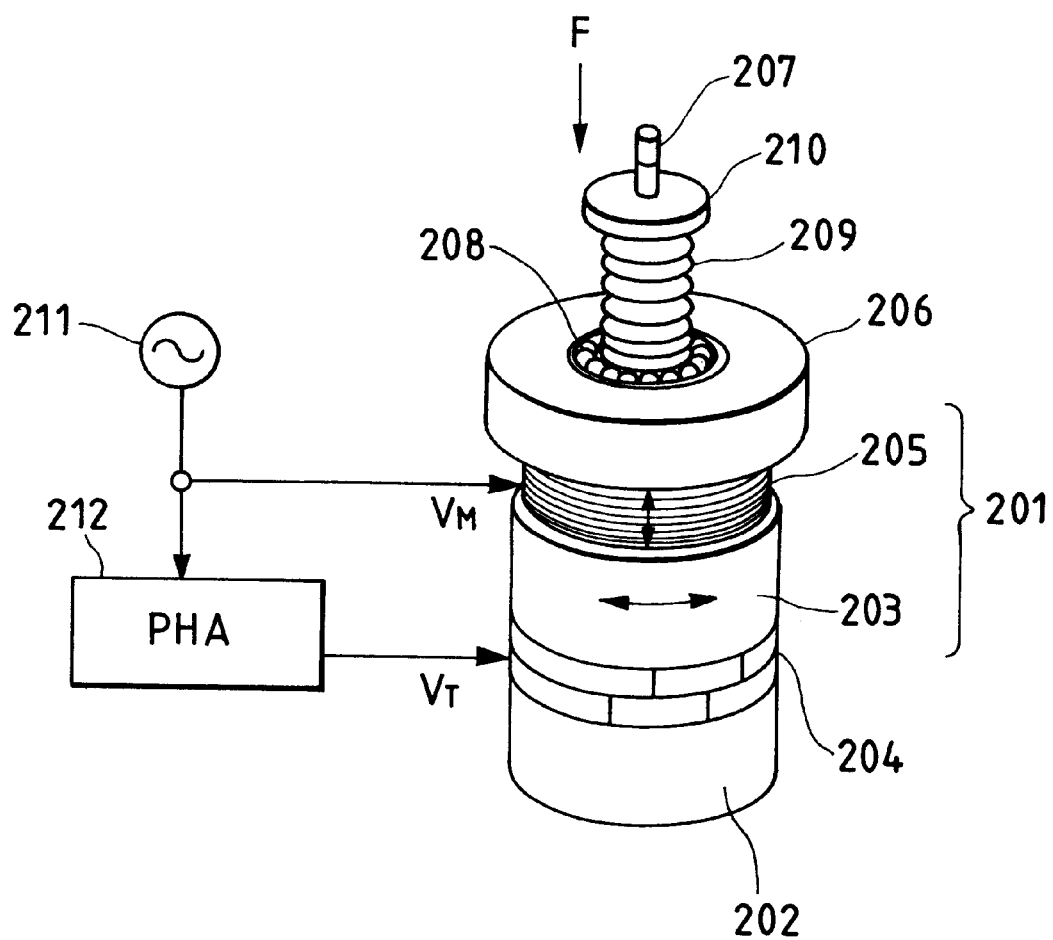
FIG. 19 is a developed perspective view showing the stator of the ultrasonic actuator according to the prior art.

FIGS. 16A and 16B illustrate that 1st-order longitudinal vibration and 2nd-order torsional vibration are created by the excitation of the piezoelectric members.

The principle on which torsional vibration and longitudinal vibration are created is similar to that described in the previous embodiment. However, the resilient members 152 and 153 in the present embodiment have small-diametered portions 152*b* and 153*b* of weak torsional rigidity between the first large-diametered portions 152*a*, 153*a* and the second large-diametered portions 152*c*, 153*c*, and the length of the first large-diametered portions 152*a*, 153*a* is greater than the length of the second large-diametered portions 152*c*, 153c. Accordingly, torsional vibration assumes a secondary mode in which two nodes are created in the middle of the small-diametered portions 152b, 153b and the first large-diametered portions 152a, 153a.

On the other hand, longitudinal vibration is hard to be affected in shape by the small-diametered portions 152b, 153b and therefore assumes a primary mode in which a node is created in the middle of a length including the first large-diametered portions 152a, 153a, the second large-diametered portions 152c, 153c and the small-diametered portions 152b, 153b. In this case, the driving surface E becomes an antinode in which both torsional vibration and longitudinal vibration are great in amplitude.

In such an ultrasonic actuator, the variation in the resonance frequency of longitudinal vibration is greater than the variation in the resonance frequency of torsional vibration relative to the variation in the length of the second large-diametered portions 152c, 153c. Accordingly, by varying the length of the second large-diametered portions 152c, 153c, the resonance frequency of torsional vibration and the resonance frequency of longitudinal vibration can be made coincident with each other and also, the resonance frequency of torsional vibration can be made higher than the resonance frequency of longitudinal vibration.

An attempt has been actually made to design an ultrasonic actuator using a heteromorphic mode degeneration type vibrator of longitudinal vibration and torsional vibration according to a second embodiment. The stator 151 is formed of two kinds of materials, i.e., resilient members 152, 153 and piezoelectric members 154, 155 and further, the resilient members 152, 153 are of a complicated shape so as to have large-diametered portions and small-diametered portions. Here, in order to improve the accuracy of calculation, the resonance frequencies of torsional vibration and longitudinal vibration have been found by the finite element method.

Resilient members 152, 153: stainless steel
Piezoelectric member 154 for torsional vibration: PZT of thickness 0.5 mm $d_{15}=510\times10^{-12}$ m/V
Piezoelectric member 155 for longitudinal vibration: PZT of thickness 0.5 mm $d_{31}=-135\times10^{-12}$ m/V Example 3 of the Manufacture Length of the first large-diametered portions: 20 mm
Length of the small-diametered portions: 1 mm
Length of the second large-diametered portions: 4 mm
Resonance frequency of longitudinal vibration: 72.9 kHz
Resonance frequency of torsional vibration: 73.4 kHz Example 4 of the Manufacture Length of the first large-diametered portions: 20 mm
Length of the small-diametered portions: 1 mm
Length of the second large-diametered portions: 3 mm
Resonance frequency of longitudinal vibration: 81.7 kHz
Resonance frequency of torsional vibration: 77.5 kHz By thus adjusting the length of the second large-diametered portions 152c, 153c, the resonance frequency of torsional vibration could be made higher than the resonance frequency of longitudinal vibration.

The operation of the ultrasonic actuator of this embodiment will now be described. It is to be noted that the drive circuit in this embodiment is the same as that in the previous embodiment.

The oscillating portion oscillates a driving signal, which is divided into two signals having a phase difference of (¼)λ therebetween by the phase shifting portion, and the two signals are amplified by the T-amplifying portion and the L-amplifying portion, respectively. The driving signal amplified by the T-amplifying portion is inputted to the piezoelectric member 154 for torsional vibration, and the driving signal amplified by the L-amplifying portion is inputted to the piezoelectric member 155 for longitudinal vibration. In the stator 151, 1st-order longitudinal vibration and 2nd-order torsional vibration are created by the excitation of the piezoelectric members 154 and 155 when the driving signals are inputted thereto, and elliptical motion resulting from those vibrations being combined together is created in the driving surface E. Since the mover 156 is pressed against the driving surface E of the stator 151, a drive force is frictionally transmitted from the stator 151 to the mover 156, which is thus driven.

Again in the present embodiment, as in the previous embodiment, the resonance frequency of the 2nd-order torsional vibration is made higher than the resonance frequency of the 1st-order longitudinal vibration. Thereby, the same effect as that of the previous embodiment is obtained.

Also, in the present embodiment, the resonance frequency of torsional vibration and the resonance frequency of longitudinal vibration can be determined by the stator alone, and this leads to the advantage that the shape of the mover can be made free. For that purpose, it is necessary to make the propagation of vibration from the stator to the mover small, and it is possible by making the attenuation of the vibration of the mover itself great, for example, by the use of a sliding material of great vibration attenuation or by the use of a material of great attenuating property as the base material of the mover.

The present invention is not restricted to the above-described embodiments, but various modifications and changes thereof are possible, and they are also covered by the present invention.

Figure 14:
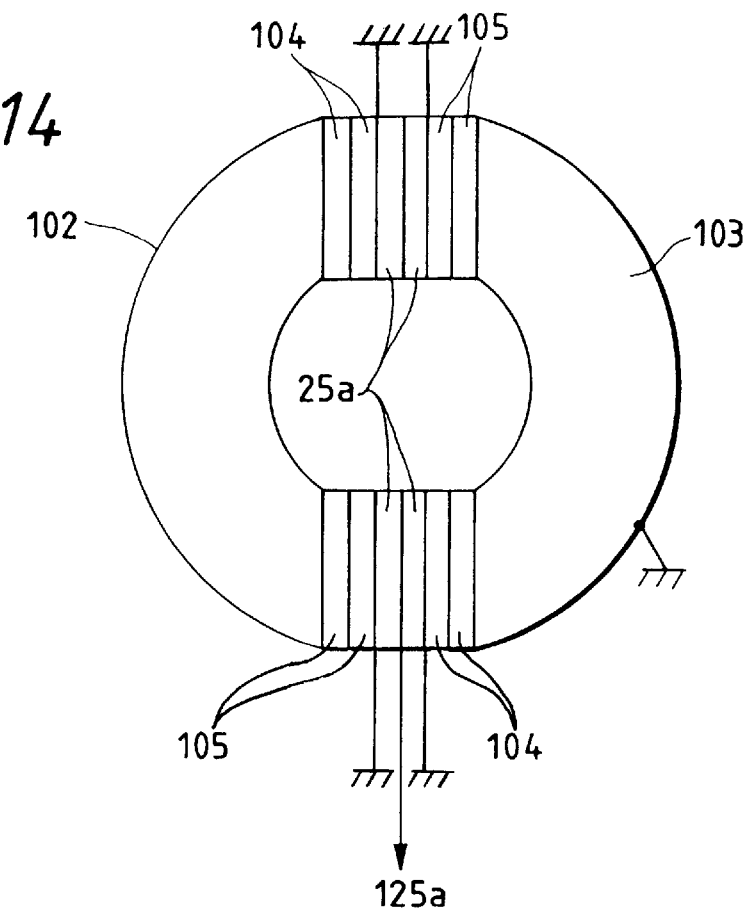
FIG. 14 shows a modification of the stator of the ultrasonic actuator according to the embodiment of FIG. 9.

For example, in FIGS. 10A and 10B, the piezoelectric member 125a for detection has been shown as being attached to a side surface of the resilient member 102 (or 103), but alternatively, it may be disposed in such a manner as to be sandwiched between the piezoelectric members 104 and 105, as shown in FIG. 14.

Also, in the present embodiment, use is made of a method of detecting vibration by the piezoelectric member 125a provided on the stator 101, but alternatively, use may be made of a method of directly detecting the number of revolutions by an encoder or the like, and transmitting the result of the detection to the controlling portion 126.

While in the present embodiment, the electromechanical conversion elements have been described by taking piezoelectric members as an example, use may be made of electrostrictive elements or other elements if they convert electrical energy into mechanical displacement.

The present embodiment has been described with respect to a case where design is made such that the 1st-order torsional vibration mode and the 1st-order longitudinal vibration mode are created in the resilient member, and a case where design is made such that the second-order torsional vibration mode and the first-order longitudinal vibration mode are created in the resilient member, but even in a resilient member wherein design is made such that the mth-order torsional vibration mode and the nth-order longitudinal vibration mode are created, a similar effect will be obtained if design is made such that the resonance frequency of longitudinal vibration<the resonance frequency of torsional vibration.

According to the present embodiment, the torsional mth-order resonance frequency is made higher than the longitudinal nth-order resonance frequency so that driving may be effected by a frequency range higher than the resonance frequency of torsional vibration and therefore, a stable driving performance can be obtained and the drive force and driving efficiency can be improved. Also, the individual difference in performance due to the machining tolerance can be reduced.

According to the present invention, the nth-order longitudinal vibration is made into 1st-order longitudinal vibration and the mth-order torsional vibration is made into 1st-order torsional vibration or 2nd-order torsional vibration and therefore, the amplitudes of the respective vibrations can be made great and the drive force can be improved.

According to the present invention, design is made such that driving is effected by a frequency range higher than the resonance frequency of the mth-order torsional vibration and therefore, driving can always be effected by a higher frequency range of two resonance frequencies and stable driving can be attained.

What is claimed is:

1. A vibration actuator comprising:

a vibration element which vibrates with a first vibration mode and with a second vibration mode which is in a direction different from the first vibration mode; and a relative moving member which executes relative motion in accordance with the vibration of said vibration element, in the first vibration mode, vibration of said vibration element being made substantially along a direction coincident with the direction of the relative motion, and in the second vibration mode, vibration of said vibration element being made substantially along a direction perpendicular to the vibration direction in the first vibration mode, and a resonance frequency of said vibration element in the first vibration mode being higher than the resonance frequency of said vibration element in the second vibration mode so that said relative moving member is driven in a stable state.

2. A vibration actuator comprising:

a vibration element having an electro-mechanical conversion element adapted to convert electrical energy into mechanical energy and to be excited by a driving signal, and a resilient member joined to said electro-mechanical conversion element and creating a drive force in the driving surface thereof by n-th order longitudinal vibration and m-th order torsional vibration being created by the excitation of said electro-mechanical conversion element, where n and m are integers greater than or equal to 1; and a relative moving member in contact with the driving surface of said resilient member and effecting motion relative to said resilient member, the torsional vibration being substantially along a direction coincident to the direction of the motion, and the longitudinal vibration being substantially along a direction perpendicular to the direction of the motion, and the resonance frequency of said m-th order torsional vibration of said vibration element being higher than the resonance frequency of said n-th order longitudinal vibration of said vibration element so that said relative moving member is driven in a stable state.

3. The vibration actuator of claim 2, wherein said n is 1 and said m is 1 or 2.

4. The vibration actuator of claim 2, wherein said drive circuit outputs a driving signal of a frequency range higher than the resonance frequency of said m-th order torsional vibration.

5. The vibration actuator of claim 2, wherein the resonance frequency of said m-th order torsional vibration becomes higher than the resonance frequency of said n-th order longitudinal vibration by the dimension of said relative moving member in the direction of said longitudinal vibration being made long.

6. The vibration actuator of claim 2, wherein said resilient member is composed of a first large-diametered portion, a second large-diametered portion and a small-diametered portion, and the resonance frequency of said m-th order torsional vibration becomes higher than the resonance frequency of said n-th order longitudinal vibration by the dimension of said second large-diametered portion in the direction of said longitudinal vibration being made long.

7. The vibration actuator of claim 2, further comprising a drive circuit outputting a driving signal to said electro-mechanical conversion element.

* * * * *

UNITED STATES PATENT AND TRADEMARK OFFICE
CERTIFICATE OF CORRECTION

PATENT NO. : 6,252,332 B1
DATED : June 26, 2001
INVENTOR(S) : Tadao Takagi et al.

Page 1 of 1

It is certified that error appears in the above-identified patent and that said Letters Patent is hereby corrected as shown below:

Title page,
Item [56], Reference Cited, U.S. PATENT DOCUMENTS, add
-- 5,200,665    4/1993       Iijima          310/323 --.

Signed and Sealed this

Twelfth Day of March, 2002

Attest:

Attesting Officer

JAMES E. ROGAN
Director of the United States Patent and Trademark Office